United States Patent
Ozaki et al.

(10) Patent No.: US 11,658,302 B2
(45) Date of Patent: May 23, 2023

(54) CONDUCTIVE CARBON MATERIAL DISPERSING AGENT FOR LITHIUM ION BATTERY, SLURRY FOR LITHIUM ION BATTERY ELECTRODE, ELECTRODE FOR LITHIUM ION BATTERY, AND LITHIUM ION BATTERY

(71) Applicant: ARAKAWA CHEMICAL INDUSTRIES, LTD., Osaka (JP)

(72) Inventors: Shinji Ozaki, Osaka (JP); Katsuhiko Ikeyatsu, Osaka (JP); Katsuya Okubo, Osaka (JP); Satoru Aoyama, Osaka (JP); Naoki Sasagawa, Osaka (JP); Hideki Goda, Osaka (JP)

(73) Assignee: ARAKAWA CHEMICAL INDUSTRIES, LTD., Osaka (JP)

( * ) Notice: Subject to any disclaimer, the term of this patent is extended or adjusted under 35 U.S.C. 154(b) by 337 days.

(21) Appl. No.: 17/095,750

(22) Filed: Nov. 12, 2020

(65) Prior Publication Data

US 2021/0151766 A1 May 20, 2021

(30) Foreign Application Priority Data

Nov. 15, 2019 (JP) .............................. JP2019-206714

(51) Int. Cl.

| | |
|---|---|
| *H01M 4/62* | (2006.01) |
| *C08L 1/28* | (2006.01) |
| *C08L 9/06* | (2006.01) |
| *C08L 33/08* | (2006.01) |
| *C08L 77/06* | (2006.01) |
| *H01M 4/13* | (2010.01) |
| *H01M 10/0525* | (2010.01) |

(52) U.S. Cl.
CPC ............ *H01M 4/625* (2013.01); *C08L 1/286* (2013.01); *C08L 9/06* (2013.01); *C08L 33/08* (2013.01); *C08L 77/06* (2013.01); *H01M 4/13* (2013.01); *H01M 10/0525* (2013.01); *C08L 2205/025* (2013.01); *C08L 2205/03* (2013.01)

(58) Field of Classification Search
None
See application file for complete search history.

(56) References Cited

FOREIGN PATENT DOCUMENTS

| | | |
|---|---|---|
| JP | 2016122594 | 7/2016 |
| JP | 2018006334 | 1/2018 |
| KR | 20040087656 | 10/2004 |
| KR | 20090018981 | 2/2009 |
| KR | 20160045142 | 4/2016 |
| KR | 20180099560 | 9/2018 |
| KR | 20190074228 | 6/2019 |
| KR | 20200013221 | 2/2020 |
| KR | 20200039570 | 4/2020 |
| WO | 2012133030 | 7/2014 |
| WO | 2018101294 | 6/2018 |

OTHER PUBLICATIONS

Machine Translation of Korean Patent Publication No. 20180099560 (Year: 2018).*
Office Action of Korea Counterpart Application, with English translation thereof, dated Dec. 31, 2020, pp. 1-8.
"Search Report of Korea Counterpart Application", with partial English translation thereof, dated Nov. 17, 2020, pp. 1-7.
"Extended Search Report of Europe Counterpart Application", dated Apr. 13, 2021, p. 1-p. 7.

* cited by examiner

*Primary Examiner* — Wyatt P McConnell
(74) *Attorney, Agent, or Firm* — JCIPRNET

(57) ABSTRACT

To provide a conductive carbon material dispersing agent for a lithium ion battery, a slurry for a lithium ion battery electrode, an electrode for a lithium ion battery, and a lithium ion battery
The disclosure provides a conductive carbon material dispersing agent for a lithium ion battery including a water-soluble poly(meth)acrylamide (A-1) which contains 2 to 60 mol % of structural units derived from a (meth)acrylamide group-containing compound (a) and 10 to 70 mol % of structural units derived from an unsaturated sulfonic acid or salts thereof (b), and which has a weight average molecular weight of 10,000 to 300,000.

6 Claims, No Drawings

CONDUCTIVE CARBON MATERIAL DISPERSING AGENT FOR LITHIUM ION BATTERY, SLURRY FOR LITHIUM ION BATTERY ELECTRODE, ELECTRODE FOR LITHIUM ION BATTERY, AND LITHIUM ION BATTERY

CROSS-REFERENCE TO RELATED APPLICATIONS

This application claims the priority benefit of Japan Patent Application No. 2019-206714, filed on Nov. 15, 2019. The entirety of the above-mentioned patent application is hereby incorporated by reference herein and made a part of this specification.

BACKGROUND

Technical Field

The disclosure relates to a conductive carbon material dispersing agent for a lithium ion battery, a slurry for a lithium ion battery electrode, an electrode for a lithium ion battery, and a lithium ion battery.

Description of Related Art

Lithium ion batteries are small and lightweight and have a high energy density, and have a characteristic of being repeatedly charged and discharged, and are used in a wide range of applications. Therefore, in recent years, in order to further improve the performance of lithium ion batteries, improvement in battery members such as an electrode has been studied.

Both a positive electrode and a negative electrode of a lithium ion battery are produced by applying a slurry obtained by dispersing an electrode active material and a binder resin in a solvent onto both surfaces of a current collector (for example, a metal foil), drying and removing the solvent, and forming an electrode layer, and then compressing and molding it with a roll press machine or the like.

The slurry for a lithium ion battery may contain a conductive carbon material as a conductive aid. Examples of conductive carbon materials include carbon black.

When the slurry for a lithium ion battery contains a conductive carbon material, such a conductive carbon material may not disperse in the slurry. In this case, the conductive carbon material cannot sufficiently serve as a conductive aid. Therefore, a dispersing agent for dispersing the conductive carbon material is required. In addition, since the dispersing agent is used in a lithium ion battery, it is preferable that the dispersing agent have characteristics of low swelling and having favorable electrolytic solution resistance with respect to the electrolytic solution of the lithium ion battery.

Here, an objective achieved by the disclosure is to provide a conductive carbon material dispersing agent for a lithium ion battery which allows a conductive carbon material for a lithium ion battery to favorably disperse and which has characteristics of low swelling and having favorable electrolytic solution resistance with respect to the electrolytic solution of the lithium ion battery.

The inventors conducted extensive studies and as a result, found that the above problems can be solved using specific components.

SUMMARY

According to the disclosure, the following items are provided.

(Item 1)
A conductive carbon material dispersing agent for a lithium ion battery, including a water-soluble poly(meth)acrylamide (A-1) which contains 2 to 60 mol % of structural units derived from a (meth)acrylamide group-containing compound (a) and 10 to 70 mol % of structural units derived from an unsaturated sulfonic acid or salts thereof (b), and which has a weight average molecular weight of 10,000 to 300,000.

(Item 2)
The conductive carbon material dispersing agent for a lithium ion battery according to the above item, wherein the water-soluble poly(meth)acrylamide (A-1) contains 20 to 70 mol % of a structural unit derived from a (meth)acrylic acid ester (c).

(Item 3)
A slurry for a lithium ion battery electrode includes the conductive carbon material dispersing agent for a lithium ion battery according to any one of the above items; a polymer (A-2); an electrode active material (B-1); a conductive carbon material (B-2); and water.

(Item 4)
The slurry for a lithium ion battery electrode according to the above item, wherein the polymer (A-2) is a water-soluble poly(meth)acrylamide (A-2A) containing a structural unit derived from a (meth)acrylamide group-containing compound (a).

(Item 5)
An electrode for a lithium ion battery obtained by applying the slurry for a lithium ion battery electrode according to any one of the above items to a current collector and performing drying.

(Item 6)
A lithium ion battery including the electrode for a lithium ion battery according to the above item.

In the disclosure, the above-described one or more features may be provided in additional combinations in addition to the specified combinations.

DESCRIPTION OF THE EMBODIMENTS

The conductive carbon material dispersing agent for a lithium ion battery of the disclosure allows the conductive carbon material for a lithium ion battery to disperse favorably. Further, the conductive carbon material dispersing agent for a lithium ion battery has a low electrolytic solution swelling ratio and high electrolytic solution resistance. In addition, the slurry for a lithium ion battery electrode of the disclosure has excellent storage stability. In addition, the electrode of the disclosure has excellent electrode adhesion. Thus, the battery of the disclosure has an excellent discharge capacity retention rate.

Throughout the disclosure, numerical value ranges of values of physical properties, contents, and the like can be appropriately set (for example, by selecting from among upper limit and lower limit values described in the following items). Specifically, regarding the numerical value α, when A4, A3, A2, A1 (A4>A3>A2>A1) and the like are exemplified as the upper limit and the lower limit of the numerical value α, examples of the range of the numerical value α include A4 or less, A3 or less, A2 or less, A1 or more, A2 or more, A3 or more, A1 to A2, A1 to A3, A1 to A4, A2 to A3, A2 to A4, and A3 to A4.

[Conductive Carbon Material Dispersing Agent for Lithium Ion Battery: Also Called Dispersant]

The disclosure provides a conductive carbon material dispersing agent for a lithium ion battery including a water-soluble poly(meth)acrylamide (A-1) which contains 2 to 60 mol % of structural units derived from a (meth)acrylamide group-containing compound (a) and 10 to 70 mol % of structural units derived from an unsaturated sulfonic acid or salts thereof (b), and which has a weight average molecular weight of 10,000 to 300,000.

<Water-Soluble Poly(Meth)Acrylamide (A-1): Also Called Component (A-1)>

Components (A-1) may be used alone or two or more thereof may be used in combination.

In the disclosure, "water soluble" means that, when 0.5 g of the compound is dissolved in 100 g of water at 25° C., the insoluble content is less than 0.5 mass % (less than 2.5 mg).

In the disclosure, "(meth)acryl" means "at least one selected from the group consisting of acryl and methacryl." Similarly, "(meth)acrylate" means "at least one selected from the group consisting of acrylate and methacrylate." In addition, "(meth)acryloyl" means "at least one selected from the group consisting of acryloyl and methacryloyl."

<(Meth)acrylamide Group-Containing Compound (a): Also Called Component (a)>

In the disclosure, "(meth)acrylamide group-containing compound" means a compound having a (meth)acrylamide group. Regarding the (meth)acrylamide group-containing compound, various known compounds can be used without particular limitation, and they may be used alone or two or more thereof may be used in combination.

In one embodiment, a (meth)acrylamide group-containing compound is represented by the following structural formula:

[Chem. 1]

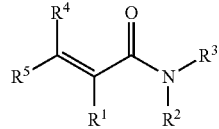

(in the formula, $R^1$ represents a hydrogen atom or a methyl group, $R^2$ and $R^3$ each independently represent a hydrogen atom, a substituted or unsubstituted alkyl group, or an acetyl group or $R^2$ and $R^3$ are groups which together form a ring structure, $R^4$ and $R^5$ each independently represent a hydrogen atom, a substituted or unsubstituted alkyl group, a hydroxy group, an amino group (—$NR^aR^b$ ($R^a$ and $R^b$ each independently represent a hydrogen atom or a substituted or unsubstituted alkyl group)), or an acetyl group; examples of substituents for a substituted alkyl group include a hydroxy group, an amino group, and an acetyl group; and examples of groups $R^2$ and $R^3$ which together form a ring structure include a morpholino group)

Examples of alkyl groups include linear alkyl groups, branched alkyl groups, and cycloalkyl groups.

The linear alkyl group is represented by a general formula of —$C_nH_{2n+1}$ (n is an integer of 1 or more). Examples of linear alkyl groups include methyl groups, ethyl groups, propyl groups, n-butyl groups, n-pentyl groups, n-hexyl groups, n-heptyl groups, n-octyl groups, n-nonyl groups, and n-decamethyl groups.

The branched alkyl group is a group in which at least one hydrogen atom of a linear alkyl group is substituted with an alkyl group. Examples of branched alkyl groups include i-propyl groups, i-butyl groups, s-butyl groups, t-butyl groups, diethylpentyl groups, trimethylbutyl groups, trimethylpentyl groups, and trimethylhexyl groups.

Examples of cycloalkyl groups include monocyclic cycloalkyl groups, crosslinked ring cycloalkyl groups, and condensed ring cycloalkyl groups.

In the disclosure, a monocyclic compound means a ring structure formed by covalent bonds between carbon atoms and having no bridged structure therein. In addition, a condensed ring means a ring structure in which two or more monocyclic compounds share two atoms (that is, only one side of each ring is shared (condensed)). A crosslinked ring means a ring structure in which two or more monocyclic compounds share three or more atoms.

Examples of monocyclic cycloalkyl groups include cyclopentyl groups, cyclohexyl groups, cycloheptyl groups, cyclodecyl groups, and 3,5,5-trimethylcyclohexyl groups.

Examples of crosslinked ring cycloalkyl groups include tricyclodecyl groups, adamantyl groups, and norbornyl groups.

Examples of condensed ring cycloalkyl groups include bicyclodecyl groups.

Examples of (meth)acrylamide group-containing compounds (a) include (meth)acrylamide, N-isopropyl (meth)acrylamide, N,N-dimethyl (meth)acrylamide, N,N-diethyl (meth)acrylamide, N,N-dimethylaminopropyl (meth)acrylamide, N-methylol (meth)acrylamide, diacetone (meth)acrylamide, maleic acid amide, (meth)acryloylmorpholine, hydroxyethyl (meth)acrylamide, and salts thereof, and examples of salts include dimethylaminopropyl (meth)acrylamide methyl chloride quaternary salts, and dimethylaminoethyl (meth)acrylate benzyl chloride quaternary salts. Among these, when (meth)acrylamide, and particularly, acrylamide is used, not only is water absorption reduced while maintaining water solubility, but also the irreversible capacity is reduced, the interaction with an electrode active material is improved, the dispersibility in a slurry is improved, and a binder having a property of allowing excellent binding with respect to the electrode active material in the electrode can be produced.

Examples of the upper limit and the lower limit of the content of structural units derived from (meth)acrylamide group-containing compounds with respect to 100 mol % of all structural units of the component (A-1) include 60, 59, 55, 50, 45, 40, 35, 30, 25, 20, 15, 10, 9, 5, 3, and 2 mol %. In one embodiment, the content is preferably 2 to 60 mol %.

Examples of the upper limit and the lower limit of the content of structural units derived from (meth)acrylamide group-containing compounds with respect to 100 mass % of all structural units of the component (A-1) include 70, 65, 60, 55, 50, 45, 40, 35, 30, 25, 20, 15, 10, 9, 5, 4, 2, and 1 mass %. In one embodiment, the content is preferably 1 to 70 mass %.

<Unsaturated Sulfonic Acid or Salts Thereof (b): Also Called Component (b)>

Regarding the component (b), various known components can be used without particular limitation, and they may be used alone or two or more thereof may be used in combination. Here, in the disclosure, when a compound A corresponds to both the component (a) and the component (b), the compound A is referred to as the component (b).

Examples of unsaturated sulfonic acids include α,β-ethylenically unsaturated sulfonic acids such as vinyl sulfonic acid, styrene sulfonic acid, and (meth)allyl sulfonic acid; and (meth)acrylamide t-butyl sulfonic acid, 2-(meth)acrylamide-2-methylpropane sulfonic acid, 2-(meth)acrylamide-2-hydroxypropane sulfonic acid, 3-sulfopropane (meth)acrylic acid ester, and bis-(3-sulfopropyl)itaconic acid ester.

Examples of unsaturated sulfonic acid salts include inorganic salts of unsaturated sulfonic acids. An inorganic salt of an unsaturated sulfonic acid refers to a salt in which a cationic moiety is a metal cation. Examples of inorganic salts include typical metal salts and transition metal salts.

Examples of typical metal salts include alkali metal salts, alkaline earth metal salts, and Group 13 metal salts.

Examples of alkali metal salts include lithium salts, sodium salts, and potassium salts.

Examples of alkaline earth metal salts include magnesium salts and calcium salts.

Examples of Group 13 metal salts include aluminum salts.

Examples of transition metal salts include iron salts.

Examples of the upper limit and the lower limit of the content of structural units derived from an unsaturated sulfonic acid or its salts (b) with respect to 100 mol % of all structural units of the component (A-1) include 70, 69, 65, 60, 55, 50, 45, 40, 35, 30, 25, 20, 15, and 10 mol %. In one embodiment, the content is preferably 10 to 70 mol %.

Examples of the upper limit and the lower limit of the content of structural units derived from an unsaturated sulfonic acid or its salts (b) with respect to 100 mass % of all structural units of the component (A-1) include 70, 65, 60, 55, 50, 45, 40, 35, 30, 25, 20, 15, 10, and 5 mass %. In one embodiment, the content is preferably 5 to 70 mass %.

<(Meth)acrylic Acid Ester (c): Also Called Component (c)>

Regarding the component (c), various known components can be used without particular limitation, and they may be used alone or two or more thereof may be used in combination.

Examples of (meth)acrylic acid esters include substituent-free (meth)acrylic acid esters and substituent-containing (meth)acrylic acid esters.

In the disclosure, the substituent-free (meth)acrylic acid ester means a (meth)acrylic acid ester in which atoms forming the compound are all carbon atoms and hydrogen atoms except for oxygen atoms forming an ester bond. The substituent-containing (meth)acrylic acid ester means a (meth)acrylic acid ester that is not a substituent-free (meth)acrylic acid ester.

Examples of substituent-free (meth)acrylic acid esters include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, n-hexyl (meth)acrylate, 2-ethylhexyl (meth)acrylate, and lauryl (meth)acrylate.

Examples of substituent-containing (meth)acrylic acid esters include a hydroxy group-containing (meth)acrylic acid ester and an alkoxy group-containing (meth)acrylic acid ester.

Examples of hydroxy group-containing (meth)acrylic acid esters include 1-hydroxyethyl (meth)acrylate, 2-hydroxyethyl (meth)acrylate, 1-hydroxypropyl (meth)acrylate, 2-hydroxypropyl (meth)acrylate, 3-hydroxypropyl (meth)acrylate, 2-hydroxy-1-methylethyl (meth)acrylate, 1-hydroxy-2-methylethyl (meth)acrylate, 1-hydroxybutyl (meth)acrylate, 2-hydroxybutyl (meth)acrylate, 3-hydroxybutyl (meth)acrylate, 4-hydroxybutyl (meth)acrylate, 1-hydroxy-1-methyl-propyl (meth)acrylate, 2-hydroxy-1-methyl-propyl (meth)acrylate, 3-hydroxy-1-methyl-propyl (meth)acrylate, 1-ethyl-2-hydroxyethyl (meth)acrylate, 1-hydroxy-2-methyl-propyl (meth)acrylate, 2-hydroxy-2-methyl-propyl (meth)acrylate, 3-hydroxy-2-methyl-propyl (meth)acrylate, 1,1-dimethyl-2-hydroxyethyl (meth)acrylate, 3-hydroxy-1-adamantyl (meth)acrylate, 1,4-cyclohexanedimethanol mono(meth)acrylate, glycerin mono(meth)acrylate, glycerin di(meth)acrylate, 2-hydroxy-3-phenoxypropyl (meth)acrylate, pentaerythritol tri(meth)acrylate, polyethylene glycol-mono(meth)acrylate, polypropylene glycol-mono(meth)acrylate, and polyethylene glycol-propylene glycol-mono(meth)acrylate.

Examples of alkoxy group-containing (meth)acrylic acid esters include methoxymethyl (meth)acrylate, 2-methoxyethyl (meth)acrylate, 1-methoxyethyl (meth)acrylate, 3-methoxypropyl (meth)acrylate, 2-methoxypropyl (meth)acrylate, 1-methoxypropyl (meth)acrylate, 4-methoxybutyl (meth)acrylate, 3-methoxybutyl (meth)acrylate, 2-methoxybutyl (meth)acrylate, 1-methoxybutyl (meth)acrylate, ethoxymethyl (meth)acrylate, 2-ethoxyethyl (meth)acrylate, 1-ethoxyethyl (meth)acrylate, 3-ethoxypropyl (meth)acrylate, 2-ethoxypropyl (meth)acrylate, 1-ethoxypropyl (meth)acrylate, propoxymethyl (meth)acrylate, 2-propoxyethyl (meth)acrylate, 1-propoxyethyl (meth)acrylate, and butoxymethyl (meth)acrylate.

In one embodiment, the (meth)acrylic acid ester is a polyoxyalkylene group represented by the following structural formula:

[Chem. 2]

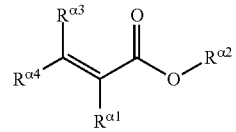

[in the formula, $R^{\alpha 1}$ represents a hydrogen atom or a methyl group, and $R^{\alpha 2}$ represents an alkyl group, a hydroxyalkyl group, an alkoxyalkyl group, or

[Chem. 3]

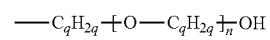

(in the formula, q is an integer of 1 to 3, n is an integer of 0 to 100, and preferably 0 to 10), $R^{\alpha 3}$ and $R^{\alpha 4}$ each independently represent a hydrogen atom, a substituted or unsubstituted alkyl group, a carboxylic group, a hydroxy group, an amino group [—$NR^a R^b$ ($R^a$ and $R^b$ each independently represent a hydrogen atom or a substituted or unsubstituted alkyl group)], or an acetyl group; and examples of substituents for the substituted alkyl group include a hydroxy group, an alkoxy group, an amino group, and an acetyl group].

The hydroxyalkyl group is a group in which at least one hydrogen atom of an alkyl group is substituted with a hydroxy group.

The alkoxyalkyl group is a group in which at least one hydrogen atom of an alkyl group is substituted with an alkoxy group.

The alkoxy group is a monovalent group in which an alkyl group is bonded to an oxygen atom.

Examples of the upper limit and the lower limit of the content of structural units derived from the (meth)acrylic acid ester (c) with respect to 100 mol % of all structural units of the component (A-1) include 70, 65, 60, 55, 50, 45, 40, 35, 30, 25, and 20 mol %. In one embodiment, the content is preferably 20 to 70 mol %.

Examples of the upper limit and the lower limit of the content of structural units derived from the (meth)acrylic acid ester (c) with respect to 100 mass % of all structural units of the component (A-1) include 80, 75, 70, 65, 60, 55, 50, 45, 40, 35, 30, 25, and 20 mass %. In one embodiment, the content is preferably 20 to 80 mass %.

<Monomers Other than Component (a), Component (b), and Component (c): Also Called Component (d)>

In all structural units of the component (A-1), a structural unit derived from monomers (component (d)) that does not correspond to any of the component (a), the component (b), and the component (c) can be used as long as it does not impair the desired effect of the disclosure. Components (d) may be used alone or two or more thereof may be used in combination. Examples of components (d) include unsaturated carboxylic acids, unsaturated phosphoric acids, α,β-unsaturated nitriles, conjugated dienes, vinyl ether, and aromatic vinyl compounds.

Examples of unsaturated carboxylic acids include (meth)acrylic acid, crotonic acid, maleic acid, fumaric acid, and itaconic acid.

The content of structural units derived from an unsaturated carboxylic acid with respect to 100 mol % of all structural units of the component (A-1) is preferably less than 40 mol % (for example, less than 30, 25, 20, 19, 15, 10, 5, or 1 mol %, 0 mol %).

The content of structural units derived from an unsaturated carboxylic acid with respect to 100 mass % of all structural units of the component (A-1) is preferably less than 40 mass % (for example, less than 30, 25, 20, 19, 15, 10, 5, or 1 mass %, 0 mass %).

Examples of unsaturated phosphoric acids include vinyl phosphonic acid, vinyl phosphate, bis((meth)acryloxyethyl) phosphate, diphenyl-2-(meth)acryloyloxyethyl phosphate, dibutyl-2-(meth)acryloyloxyethyl phosphate, dioctyl-2-(meth)acryloyloxyethyl phosphate, monomethyl-2-(meth)acryloyloxyethyl phosphate, and 3-(meth)acryloxy-2-hydroxypropane phosphate.

The content of structural units derived from an unsaturated phosphoric acid with respect to 100 mol % of all structural units of the component (A-1) is preferably less than 40 mol % (for example, less than 30, 25, 20, 19, 15, 10, 5, or 1 mol %, 0 mol %).

The content of structural units derived from an unsaturated phosphoric acid with respect to 100 mass % of all structural units of the component (A-1) is preferably less than 40 mass % (for example, less than 30, 25, 20, 19, 15, 10, 5, or 1 mass %, 0 mass %).

α,β-Unsaturated nitriles can be suitably used in order to impart flexibility to an electrode. Examples of α,β-unsaturated nitriles include (meth)acrylonitrile, α-chloro(meth)acrylonitrile, α-ethyl (meth)acrylonitrile, and vinylidene cyanide. Among these, (meth)acrylonitrile is preferable, and acrylonitrile is particularly preferable.

The content of structural units derived from α,β-unsaturated nitriles is not particularly limited, and is preferably less than 40 mol % (for example, less than 30, 25, 20, 19, 15, 10, 5, or 1 mol %, 0 mol %) with respect to 100 mol % of all structural units of the component (A-1).

In one embodiment, the content of structural units derived from α,β-unsaturated nitriles is preferably less than 40 mass % (for example, less than 30, 25, 20, 19, 15, 10, 5, or 1 mass %, 0 mass %) with respect to 100 mass % of all structural units of the component (A-1).

Examples of conjugated dienes include 1,3-butadiene, 2-methyl-1,3-butadiene, 2,3-dimethyl-1,3-butadiene, 2-chloro-1,3-butadiene, substituted linear conjugated pentadienes, and side chain-substituted and conjugated hexadienes.

The content of structural units derived from conjugated dienes is not particularly limited, and is preferably less than 10 mol % and more preferably 0 mol % with respect to 100 mol % of all structural units of the component (A-1) in consideration of springback resistance of the lithium ion battery according to the disclosure.

In one embodiment, the content of structural units derived from conjugated dienes is preferably less than 10 mass % and more preferably 0 mass % with respect to 100 mass % of all structural units of the component (A-1).

Examples of vinyl ethers include hydroxyalkyl vinyl ethers and polyalkylene glycol monovinyl ethers.

Examples of hydroxyalkyl vinyl ethers include hydroxy linear alkyl vinyl ethers, hydroxy branched alkyl vinyl ethers, and hydroxycycloalkyl vinyl ethers.

Examples of hydroxy linear alkyl vinyl ethers include 2-hydroxyethyl vinyl ether, 3-hydroxypropyl vinyl ether, 4-hydroxybutyl vinyl ether, and 5-hydroxypentyl vinyl ether.

Examples of hydroxy branched alkyl vinyl ethers include 2-hydroxypropyl vinyl ether, 2-hydroxy-2-methylpropyl vinyl ether, and 4-hydroxy-2-methylbutyl vinyl ether.

Examples of hydroxycycloalkyl vinyl ethers include 4-hydroxycyclopentyl vinyl ether.

Examples of polyalkylene glycol monovinyl ethers include polymethylene glycol monovinyl ether, polyethylene glycol monovinyl ether, and polypropylene glycol monovinyl ether.

The content of structural units derived from vinyl ethers is not particularly limited, and is preferably less than 30 mol % and more preferably 0 mol % with respect to 100 mol % of all structural units of the component (A-1).

In one embodiment, the content of structural units derived from vinyl ethers is preferably less than 30 mass % and more preferably 0 mass % with respect to 100 mass % of all structural units of the component (A-1).

Examples of aromatic vinyl compounds include styrene, α-methylstyrene, p-methylstyrene, vinyltoluene, chlorostyrene, and divinylbenzene.

The content of structural units derived from aromatic vinyl compounds is not particularly limited, and is preferably less than 10 mol % and more preferably 0 mol % with respect to 100 mol % of all structural units of the component (A-1).

In one embodiment, the content of structural units derived from aromatic vinyl compounds is preferably less than 10 mass % and more preferably 0 mass % with respect to 100 mass % of all structural units of the component (A-1).

A proportion of all structural units of the component (A-1) of structural units derived from the component (d) other than unsaturated carboxylic acids, unsaturated phosphoric acids, α,β-unsaturated nitriles, conjugated dienes, vinyl ether, and aromatic vinyl compounds is less than 10 mol %, less than 5 mol %, less than 1 mol %, less than 0.1 mol %, less than 0.01 mol %, or 0 mol % with respect to 100 mol % of all structural units of the component (A-1), and less than 10 mass %, less than 5 mass %, less than 1 mass %, less than 0.5 mass %, less than 0.1 mass %, less than 0.01 mass %, or 0 mass % with respect to 100 mass % of all structural units of the component (A-1).

The water-soluble poly(meth)acrylamide (A-1) can be synthesized by various known polymerization methods, and preferably a radical polymerization method. The polymerization reaction may be performed by adding a radical polymerization initiator and as necessary, a chain transfer agent, to a monomer mixture solution containing the component (a) and the component (b), and as necessary, the component (c) and the component (d) at a reaction temperature of about 50 to 100° C. with stirring. The reaction time is not particularly limited, and is preferably about 1 to 10 hours. In one embodiment, the component (A-1) is preferably produced by adding dropwise a solution containing monomers and a solution containing an initiator at the same time, and performing a polymerization reaction.

Regarding the radical polymerization initiator, various known initiators can be used without particular limitation. Examples of radical polymerization initiators include persulfates such as potassium persulfate and ammonium persulfate; redox type polymerization initiators obtained by combining a persulfate with a reducing agent such as sodium bisulfate; and azo initiators such as 2,2'-azobis-2-amidinopropane dihydrochloride. The amount of the radical polymerization initiator used is not particularly limited, and is preferably 0.05 to 5.0 mass % and more preferably 0.1 to 3.0 mass % with respect to 100 mass % of all structural units of the component (A-1), which form the component (A-1).

Before the radical polymerization reaction and/or when the obtained component (A-1) is dissolved in water, in order to improve production stability, the pH of the reaction solution may be adjusted using a general neutralizing agent such as ammonia, an organic amine, potassium hydroxide, sodium hydroxide, and lithium hydroxide. In this case, the pH is preferably 2 to 11. In addition, for the same purpose, EDTA, which is a metal ion chelating agent, salts thereof, or the like can be used.

<Physical Properties and the Like of Water-Soluble Poly (Meth)Acrylamide (A-1)>

Examples of the upper limit and the lower limit of the glass transition temperature of the water-soluble poly(meth) acrylamide (A-1) include 160, 155, 150, 145, 140, 135, 130, 125, 120, 115, 110, 105, 100, 95, 90, 85, 80, 75, 70, 65, 60, 55, 50, 45, 40, 35, 30, 25, 20, 15, 10, 5, and 0° C. In one embodiment, 0° C. or higher is preferable, and in consideration of the mechanical strength and heat resistance, 30° C. or higher is more preferable.

The glass transition temperature of the water-soluble poly(meth)acrylamide can be adjusted by combining monomers. In the water-soluble poly(meth)acrylamide (A-1), the glass transition temperature can be determined from the glass transition temperature (Tg) (absolute temperature: K) of homopolymers of monomers and their mass fractions based on the following Fox formula.

$$1/Tg=(W_1/Tg_1)+(W_2/Tg_2)+(W_3/Tg_3)+ \ldots +(W_n/Tg_n)$$

[in the formula, Tg represents the glass transition temperature (K) of the polymer to be obtained, $W_1$ to $W_n$ represent mass fractions of monomers, and $Tg_1$ to $Tg_n$ represent the glass transition temperature (K) of homopolymers of monomers]

For example, the glass transition temperature is 165° C. for acrylamide homopolymers, 106° C. for acrylic acid homopolymers, −15° C. for hydroxyethyl acrylate homopolymers, and 105° C. for acrylonitrile homopolymers. A monomer composition constituting the water-soluble poly (meth)acrylamide (A-1) having a desired glass transition temperature can be determined. Here, the glass transition temperature of homopolymers of monomers can be measured by a differential scanning calorimeter (DSC), a differential thermal analyzer (DTA), a thermo mechanical analyzer (TMA), or the like, for example, under conditions (heating rate of 10° C./min) in which the temperature is raised from −100° C. to 300° C. In addition, values mentioned in the literature can be used. Examples of this literature include "Handbook of Chemistry II, The Chemical Society of Japan (revised 5th edition)", p 325.

Examples of the upper limit and the lower limit of the weight average molecular weight (Mw) of the water-soluble poly(meth)acrylamide (A-1) include 300,000, 290,000, 250,000, 200,000, 150,000, 100,000, 90,000, 50,000, 40,000, 30,000, 20,000, and 10,000. In one embodiment, the weight average molecular weight (Mw) of the water-soluble poly (meth)acrylamide (A-1) is preferably 10,000 to 300,000, and in order to improve the dispersibility of the conductive carbon material and make it difficult to form agglomerates, 10,000 or more and less than 300,000 is more preferable.

Examples of the upper limit and the lower limit of the number average molecular weight (Mn) of the water-soluble poly(meth)acrylamide (A-1) include 110,000, 100,000, 90,000, 70,000, 50,000, 30,000, 20,000, 10,000, 9,000, 7,000, and 5,000. In one embodiment, the number average molecular weight (Mn) of the water-soluble poly(meth) acrylamide (A-1) is preferably 5,000 to 110,000.

For example, the weight average molecular weight and the number average molecular weight can be determined as polyacrylic acid conversion values measured using an appropriate solvent according to gel permeation chromatography (GPC).

Examples of the upper limit and the lower limit of the molecular weight distribution (Mw/Mn) of the water-soluble poly(meth)acrylamide (A-1) include 15, 14, 13, 12, 11, 10, 9, 8, 7.5, 6, 5, 4, 3, 2.9, 2.5, 2, 1.5, and 1.1. In one embodiment, the molecular weight distribution (Mw/Mn) of the water-soluble poly(meth)acrylamide (A-1) is preferably 1.1 to 15.

Examples of the upper limit and the lower limit of the type B viscosity of a conductive carbon material dispersing agent for a lithium ion battery containing the water-soluble poly (meth)acrylamide (A-1) include 500, 450, 400, 350, 300, 250, 200, 150, 100, 50, 25, and 10 mPa·s. In one embodiment, the type B viscosity is preferably 10 to 500 mPa·s.

The type B viscosity is measured by a type B viscometer (product name, "type B viscometer model TVB-10M" commercially available from Toki Sangyo Co., Ltd.)

Examples of the upper limit and the lower limit of the pH of the conductive carbon material dispersing agent for a lithium ion battery include 7, 6.9, 6.5, 6, 5.9, 5.6, 5.5, 5.4, 5.2, 5.1, and 5. In one embodiment, the pH is preferably 5 to 7 and more preferably 5 or more and less than 7 in consideration of solution stability.

The pH can be measured using a glass electrode pH meter (for example, product name "pH meter D-52" commercially available from Horiba Ltd.) at 25° C.

Examples of the upper limit and the lower limit of the content of the water-soluble poly(meth)acrylamide (A-1) with respect to 100 mass % of the conductive carbon material dispersing agent for a lithium ion battery include 100, 95, 90, 85, 80, 75, 70, 65, 60, 55, 50, 45, 40, 35, 30, 25, 20, 19, 17, 15, 13, 10, 9, 7, and 5 mass %. In one embodiment, the content is preferably 5 to 100 mass %.

In one embodiment, the conductive carbon material dispersing agent for a lithium ion battery may contain water. Examples of the upper limit and the lower limit of the content of water with respect to 100 mass % of the conductive carbon material dispersing agent for a lithium ion battery include 95, 90, 85, 80, 75, 70, 65, 60, 55, 50, 45, 40, 35, 30, 25, 20, 15, 10, 5, and 0 mass %. In one embodiment, the content is preferably 0 to 95 mass %.

Examples of the upper limit and the lower limit of the mass ratio of water to the component (A-1) [mass of water/mass of component (A-1)] contained in the conductive carbon material dispersing agent for a lithium ion battery include 19, 17, 15, 13, 10, 9, 7, 5, 3, 2, 1, 0.9, 0.7, 0.5, 0.3, 0.1, and 0. In one embodiment, the mass ratio is preferably 0 to 19.

In one embodiment, the conductive carbon material dispersing agent for a lithium ion battery may contain an organic solvent.

Examples of organic solvents include ether solvents, ketone solvents, alcohol solvents, and amide solvents. Examples of ether solvents include dioxane and tetrahydrofuran (THF). Examples of ketone solvents include acetone and methyl ethyl ketone (MEK). Examples of alcohol solvents include methanol, ethanol, 2-propanol, and isopropyl alcohol. Examples of amide solvents include N-methyl-2-pyrrolidone (NMP).

Examples of the upper limit and lower limit of the content of the organic solvent with respect to 100 mass % of the component (A-1) include 200, 175, 150, 125, 100, 75, 50, 25, and 0 mass %. In one embodiment, the content is preferably 0 to 200 mass %.

<Neutralizing Agent>

In one embodiment, the conductive carbon material dispersing agent for a lithium ion battery may contain a neutralizing agent.

Examples of neutralizing agents include alkali metal salts and alkaline earth metal salts.

Examples of alkali metal salts include lithium salts, sodium salts, and potassium salts.

Examples of lithium salts include lithium hydroxide, lithium chloride, lithium fluoride, lithium bromide, lithium acetate, lithium sulfate, lithium carbonate, lithium phosphate, and lithium hydrogen carbonate.

Examples of sodium salts include sodium hydroxide, sodium chloride, sodium fluoride, sodium bromide, sodium acetate, sodium sulfate, sodium carbonate, sodium phosphate, and sodium hydrogen carbonate.

Examples of potassium salts include potassium hydroxide, potassium chloride, potassium fluoride, potassium bromide, potassium acetate, potassium sulfate, potassium carbonate, potassium phosphate, and potassium bicarbonate.

Examples of alkaline earth metal salts include calcium salts and magnesium salts.

Examples of magnesium salts include magnesium hydroxide, magnesium chloride, magnesium fluoride, magnesium bromide, magnesium acetate, magnesium sulfate, magnesium carbonate, magnesium phosphate, and magnesium hydrogen carbonate.

Examples of calcium salts include calcium hydroxide, calcium chloride, calcium fluoride, calcium bromide, calcium acetate, calcium sulfate, calcium carbonate, calcium phosphate, and calcium hydrogen carbonate.

Examples of the upper limit and lower limit of the content of the neutralizing agent with respect to 100 mol % of acid groups contained in the component (A-1) include 100, 95, 90, 85, 80, 75, 70, 65, 60, 55, 50, 45, 40, 35, 30, 25, 20, 15, 10, 5, and 0 mol %. In one embodiment, the content is preferably 0 to 100 mol %.

Examples of acid groups contained in the component (A-1) include sulfonic acid groups, carboxylic acid groups, and phosphate groups.

<Additives>

The conductive carbon material dispersing agent for a lithium ion battery may contain an agent that does not correspond to any of the component (A-1), water, the organic solvent, and the neutralizing agent as an additive. Examples of additives include those described below. Examples of the content of additives include 0 to 5 mass %, less than 1 mass %, less than 0.1 mass %, less than 0.01 mass %, and 0 mass % with respect to 100 mass % of the component (A-1), and examples of the content thereof include 0 to 5 mass %, less than 1 mass %, less than 0.1 mass %, less than 0.01 mass %, and 0 mass % with respect to 100 mass % of the conductive carbon material dispersing agent for a lithium ion battery.

The conductive carbon material dispersing agent for a lithium ion battery can be used as a conductive carbon material dispersing agent for a lithium ion battery electrode, a conductive carbon material dispersing agent for a lithium ion battery negative electrode, or a conductive carbon material dispersing agent for a lithium ion battery positive electrode.

Examples of conductive carbon materials include those described below.

[Slurry for Lithium Ion Battery Electrode: Also Called Slurry]

The disclosure provides a slurry for a lithium ion battery electrode including the conductive carbon material dispersing agent for a lithium ion battery, a polymer (A-2), an electrode active material (B-1), a conductive carbon material (B-2), and water.

Examples of the upper limit and the lower limit of the content of the conductive carbon material dispersing agent for a lithium ion battery with respect to 100 mass % of the slurry include 40, 35, 30, 25, 20, 15, 10, 9, 5, 4, 2, 1, 0.9, 0.5, 0.4, 0.2, and 0.1 mass %. In one embodiment, the content is preferably 0.1 to 40 mass %.

Examples of the upper limit and the lower limit of the content of the component (A-1) with respect to 100 mass % of the slurry include 40, 35, 30, 25, 20, 15, 10, 9, 5, 4.5, 2, 1, 0.9, 0.5, 0.4, 0.2, and 0.1 mass %. In one embodiment, the content is preferably 0.1 to 40 mass %.

<Polymer (A-2): Also Called Component (A-2)>

Polymers may be used alone or two or more thereof may be used in combination. The polymer can be used as a binder or an aqueous binder. The polymer means a polymer solid content synthesized in water or an organic solvent.

Examples of polymers include a water-soluble polymer and a water-insoluble polymer.

Examples of water-soluble polymers include cellulose compounds, carbohydrates, starch, starch, alginic acid, xanthan gum, chitosan, carrageenan, agar, dextrin, gelatin, polyvinyl alcohol, poly(meth)acrylamide, poly(meth)acrylic acid, polysulfone acid, polyethyleneimine, polyethylene oxide, polyvinylpyrrolidone, polyethylene glycol, polystyrene sulfonic acid, ethylene-acrylic acid copolymers, ethylene-acrylamide-acrylic acid copolymers, polyamidine, polyvinyl imidazoline and their derivatives or salts.

In the disclosure, "water-insoluble" means that, when 0.5 g of the compound is dissolved in 100 g of water at 25° C., the insoluble content is 0.5 mass % or more.

Examples of water-insoluble polymers include styrene-butadiene copolymer latex, polystyrene polymer latex, polybutadiene polymer latex, acrylonitrile-butadiene copolymer latex, polyurethane polymer latex, polymethylmethacrylate polymer latex, methyl methacrylate-butadiene copolymer latex, polyacrylate polymer latex, vinyl chloride polymer latex, vinyl acetate polymer emulsion, vinyl acetate-ethylene copolymer emulsion, polyethylene emulsion, carboxy-modified styrene-butadiene copolymer resin emulsion, acrylic resin emulsion, polyethylene, polypropylene, polyethylene terephthalate, polyamide (PA), polyimide (PI), polyamideimide (PAI), aromatic polyamides, alginic acid and salts thereof, polyvinylidene fluoride (PVDF), polytetrafluoroethylene (PTFE), tetrafluoroethylene-hexafluoropropylene copolymer (FEP), tetrafluoroethyleneperfluoroalkyl vinyl ether copolymer (PFA), and ethylene-tetrafluoroethylene copolymer (ETFE).

In one embodiment, the polymer (A-2) is a water-soluble poly(meth)acrylamide (A-2A) containing a structural unit derived from a (meth)acrylamide group-containing compound (a).

<Water-Soluble Poly(Meth)Acrylamide (A-2A): Also Called Component (A-2A)>

The component (A-2A) contains a structural unit derived from the (meth)acrylamide group-containing compound (a). The (meth)acrylamide group-containing compounds (a) may be used alone or two or more thereof may be used in combination. The component (A-1) and the component (A-2A) are preferably compatible with each other in consideration of electrode adhesion.

Examples of the upper limit and the lower limit of the content of structural units derived from (meth)acrylamide group-containing compounds with respect to 100 mol % of all structural units of the component (A-2A) include 100, 99.99, 99.9, 99.7, 99.5, 99, 95, 90, 85, 80, 75, 70, 65, 60, 55, 50, 45, 40, 35, 30, 25, 20, 15, 10, 9, 5, 3, 2, and 1 mol %. In one embodiment, the content is preferably 1 to 100 mol %.

Examples of the upper limit and the lower limit of the content of structural units derived from (meth)acrylamide group-containing compounds with respect to 100 mass % of all structural units of the component (A-2A) include 100, 99.99, 99.9, 99.7, 99.5, 99, 95, 90, 85, 80, 75, 70, 65, 60, 55, 50, 45, 40, 35, 30, 25, 20, 15, 10, 9, 5, 3, 2, and 1 mass %. In one embodiment, the content is preferably 1 to 100 mass %.

In one embodiment, the component (A-2A) may contain a structural unit derived from unsaturated organic acids or salts thereof. The unsaturated organic acids or salts thereof may be used alone or two or more thereof may be used in combination.

In the disclosure, the unsaturated organic acid means a compound having an acid group and a polymerizable unsaturated bond.

Examples of unsaturated organic acids include unsaturated carboxylic acids, unsaturated sulfonic acids, and unsaturated phosphoric acids. Examples of salts of unsaturated organic acids include inorganic salts of unsaturated organic acids. The inorganic salt of an unsaturated organic acid is a salt whose cationic moiety is a metal cation.

Examples of the upper limit and the lower limit of the content of structural units derived from unsaturated organic acids or salts thereof with respect to 100 mol % of all structural units of the component (A-2A) include 50, 45, 40, 35, 30, 25, 20, 15, 10, 5, 4, 2, 1, and 0 mol %. In one embodiment, the content is preferably 0 to 50 mol %.

Examples of the upper limit and the lower limit of the content of structural units derived from unsaturated organic acids or salts thereof with respect to 100 mass % of all structural units of the component (A-2A) include 70, 65, 60, 55, 50, 45, 40, 35, 30, 25, 20, 15, 10, 5, 4, 2, 1, and 0 mass %. In one embodiment, the content is preferably 0 to 70 mass %.

In one embodiment, the component (A-2A) may contain a structural unit derived from the (meth)acrylic acid ester (c). (Meth)acrylic acid esters may be used alone or two or more thereof may be used in combination.

Examples of the upper limit and the lower limit of the content of structural units derived from (meth)acrylic acid esters (c) with respect to 100 mol % of all structural units of the component (A-2A) include 75, 70, 65, 60, 55, 50, 45, 40, 35, 30, 25, 20, 15, 10, 5, 4, 2, 1, and 0 mol %. In one embodiment, the content is preferably 0 to 75 mol %.

Examples of the upper limit and the lower limit of the content of structural units derived from (meth)acrylic acid esters (c) with respect to 100 mass % of all structural units of the component (A-2A) include 80, 75, 70, 65, 60, 55, 50, 45, 40, 35, 30, 25, 20, 15, 10, 5, 4, 2, 1, and 0 mass %. In one embodiment, the content is preferably 0 to 80 mass %.

In one embodiment, the component (A-2A) may contain a structural unit derived from $\alpha,\beta$-unsaturated nitriles. $\alpha,\beta$-unsaturated nitriles may be used alone or two or more thereof may be used in combination.

Examples of the upper limit and the lower limit of the content of structural units derived from $\alpha,\beta$-unsaturated nitriles with respect to 100 mol % of all structural units of the component (A-2A) include 45, 40, 35, 30, 25, 20, 15, 10, 5, 2, 1, and 0 mol %. In one embodiment, the content is preferably 0 to 45 mol %.

Examples of the upper limit and the lower limit of the content of structural units derived from $\alpha,\beta$-unsaturated nitriles with respect to 100 mass % of all structural units of the component (A-2A) include 40, 35, 30, 25, 20, 15, 10, 5, 4, 2, 1, and 0 mass %. In one embodiment, the content is preferably 0 to 40 mass %.

In one embodiment, the component (A-2A) may contain a structural unit derived from a double bond-containing trihydroxysilyl compound having a vinyl group or a (meth)acryloxy group. Double bond-containing trihydroxysilyl compounds having a vinyl group or a (meth)acryloxy group may be used alone or two or more thereof may be used in combination.

Examples of the upper limit and the lower limit of the content of structural units derived from double bond-containing trihydroxysilyl compounds having a vinyl group or a (meth)acryloxy group with respect to 100 mol % of all structural units of the component (A-2A) include 0.8, 0.7, 0.5, 0.3, 0.2, 0.1, 0.09, 0.07, 0.05, and 0 mol %. In one embodiment, the content is preferably 0 to 0.8 mol %.

Examples of the upper limit and the lower limit of the content of structural units derived from double bond-containing trihydroxysilyl compounds having a vinyl group or a (meth)acryloxy group with respect to 100 mass % of all structural units of the component (A-2A) include 10, 9, 7, 5, 3, 1, 0.9, 0.5, 0.3, 0.1, 0.09, 0.05, 0.01, 0.009, 0.005, 0.001, and 0 mass %. In one embodiment, the content is preferably 0 to 10 mass %.

In one embodiment, the component (A-2A) may contain a structural unit derived from a hydroxy group-containing vinyl ether. Hydroxy group-containing vinyl ethers may be used alone or two or more thereof may be used in combination.

Examples of the upper limit and the lower limit of the content of structural units derived from hydroxy group-containing vinyl ethers with respect to 100 mol % of all structural units of the component (A-2A) include 80, 75, 70, 65, 60, 55, 50, 45, 40, 35, 30, 25, 20, 15, 10, 5, 4, 2, 1, and 0 mol %. In one embodiment, the content is preferably 0 to 80 mol %.

Examples of the upper limit and the lower limit of the content of structural units derived from hydroxy group-containing vinyl ethers with respect to 100 mass % of all structural units of the component (A-2A) include 85, 80, 75, 70, 65, 60, 55, 50, 45, 40, 35, 30, 25, 20, 15, 10, 5, 4, 2, 1, and 0 mass %. In one embodiment, the content is preferably 0 to 85 mass %.

A proportion of all structural units of the component (A-2A) derived from a compound that does not correspond to any of the (meth)acrylamide group-containing compound (a), unsaturated organic acids or salts thereof, (meth)acrylic acid esters, α,β-unsaturated nitriles, and double bond-containing trihydroxysilyl compounds having a vinyl group or a (meth)acryloxy group, and hydroxy group-containing vinyl ethers is less than 10 mol %, less than 5 mol %, less than 1 mol %, less than 0.1 mol %, less than 0.01 mol %, or 0 mol % with respect to 100 mol % of all structural units of the component (A-2A), and is less than 10 mass %, less than 5 mass %, less than 1 mass %, less than 0.5 mass %, less than 0.1 mass %, less than 0.01 mass %, or 0 mass % with respect to 100 mass % of all structural units of the component (A-2A).

The water-soluble poly(meth)acrylamide (A-2A) can be produced according to the same conditions and methods as in the component (A-1).

Examples of the upper limit and lower limit of the content of the neutralizing agent with respect to 100 mol % of acid groups contained in the component (A-2A) include 100, 95, 90, 85, 80, 75, 70, 65, 60, 55, 50, 45, 40, 35, 30, 25, 20, 15, 10, 5, and 0 mol %. In one embodiment, the content is preferably 0 to 100 mol %.

<Physical Properties and the Like of Water-Soluble poly(meth)acrylamide (A-2A)>

Examples of the upper limit and the lower limit of the glass transition temperature of the water-soluble poly(meth)acrylamide (A-2A) include 160, 155, 150, 145, 140, 135, 130, 125, 120, 115, 110, 105, 100, 95, 90, 85, 80, 75, 70, 65, 60, 55, 50, 45, 40, 35, 30, 25, 20, 15, 10, 5, and 0° C. In one embodiment, the glass transition temperature is preferably 0° C. or higher, and in consideration of the mechanical strength and heat resistance, the glass transition temperature is more preferably 30° C. or higher.

Examples of the upper limit and the lower limit of the weight average molecular weight (Mw) of the water-soluble poly(meth)acrylamide (A-2A) include 7,000,000, 6,500,000, 6,000,000, 5,500,000, 5,000,000, 4,500,000, 4,000,000, 3,500,000, 3,000,000, 2,500,000, 2,000,000, 1,500,000, 1,000,000, 950,000, 900,000, 850,000, 800,000, 750,000, 700,000, 650,000, 600,000, 550,000, 500,000, 450,000, 400,000, 350,000, 300,000, 250,000, 200,000, 150,000, and 100,000. In one embodiment, the weight average molecular weight (Mw) is preferably 100,000 to 7,000,000 and more preferably 500,000 to 1,000,000.

Examples of the upper limit and the lower limit of a ratio between weight average molecular weights of the component (A-2A) and the component (A-1) [weight average molecular weight of (A-2A)/weight average molecular weight of (A-1)] include 600, 550, 500, 450, 400, 350, 300, 250, 200, 150, 100, 90, 75, 50, 25, 10, 5, 2, and 1. In one embodiment, the ratio is preferably 1 to 600.

Examples of the upper limit and the lower limit of the number average molecular weight (Mn) of the water-soluble poly(meth)acrylamide (A-2A) include 6,000,000, 5,500,000, 5,000,000, 4,500,000, 4,000,000, 3,500,000, 3,000,000, 2,500,000, 2,000,000, 1,500,000, 1,000,000, 950,000, 900,000, 850,000, 800,000, 750,000, 700,000, 650,000, 600,000, 550,000, 500,000, 450,000, 400,000, 300,000, 200,000, 150,000, 100,000, 50,000, and 10,000. In one embodiment, the number average molecular weight (Mn) of the water-soluble poly(meth)acrylamide (A-2A) is preferably 10,000 or more and more preferably 150,000 to 500,000.

Examples of the upper limit and the lower limit of a ratio between number average molecular weights of the component (A-2A) and the component (A-1) [number average molecular weight of (A-2A)/number average molecular weight of (A-1)] include 100, 90, 75, 50, 25, 10, 5, 2, 1, 0.9, 0.5, 0.2, 0.1, and 0.09. In one embodiment, the ratio is preferably 0.09 to 100.

Examples of the upper limit and the lower limit of the molecular weight distribution (Mw/Mn) of the water-soluble poly(meth)acrylamide (A-2A) include 15, 14, 13, 11, 10, 9, 7.5, 5, 4, 3, 2.9, 2.5, 2, 1.5, and 1.1. In one embodiment, the molecular weight distribution (Mw/Mn) is preferably 1.1 to 15.

Examples of the upper limit and the lower limit of the type B viscosity of the slurry include 100,000, 90,000, 80,000, 70,000, 60,000, 50,000, 40,000, 30,000, 20,000, 10,000, 9,000, 8,000, 7,000, 6,000, 5,000, 4,000, 3,000, 2,000, and 1,000 mPa·s. In one embodiment, the type B viscosity is preferably 1,000 to 100,000 mPa·s.

Examples of the upper limit and the lower limit of the pH of the slurry include 9, 8, 7, 6.9, 6.5, 6, 5.9, 5.6, 5.5, 5.4, 5.2, 5.1, and 5. In one embodiment, in consideration of solution stability, the pH is preferably 5 to 9, more preferably 5 to 7, and still more preferably 5 or more and less than 7.

Examples of the upper limit and the lower limit of the content of the component (A-2) with respect to 100 mass % of the slurry include 40, 35, 30, 25, 20, 15, 10, 9, 5, 4.5, and 2 mass %. In one embodiment, the content is preferably 2 to 40 mass %.

Examples of the upper limit and the lower limit of the content of the component (A-2A) with respect to 100 mass % of the slurry include 40, 35, 30, 25, 20, 15, 10, 9, 5, 4.5, 2, and 0 mass %. In one embodiment, the content is preferably 0 to 40 mass %.

Examples of the upper limit and the lower limit of a mass ratio between the component (A-2A) and the component (A-1) [mass of the component (A-2A)/mass of the component (A-1)] in the slurry include 19, 17, 15, 13, 11, 10, 9, 7, 5, 4, 3, 2.5, and 2.3. In one embodiment, the mass ratio is preferably 2.3 to 19.

<Compatibility of Polymer in which Component (A-1) and Component (A-2A) are Mixed>

In consideration of electrode adhesion, the component (A-1) and the component (A-2A) are preferably compatible (without microphase separation).

Examples of a method of confirming this phase separation structure include a method of measuring a HAZE of a film.

A film of the component (A-1) and the component (A-2A) is preferably obtained by a method in which an aqueous solution containing the component (A-1) and the component (A-2A) is mixed in advance, and the aqueous solution is then applied to a flat glass plate, and a film with a thickness of 5 to 30 μm is produced in a circulating air dryer at 80° C. Here, the HAZE of the produced film can be measured using a turbidity meter "NDH-2000 (commercially available from Nippon Denshoku Industries Co., Ltd.)." The HAZE of the film is preferably 20% or less and particularly preferably 10% or less.

When the HAZE of the film is lower than 20%, this indicates that the component (A-1) and the component (A-2A) are compatible. On the other hand, when the HAZE of the film is higher than 20%, this indicates that the component (A-1) and the component (A-2A) are not compatible (microphase separated).

<Electrode Active Material (B-1): Also Called Component (B-1)>

Examples of electrode active materials include a negative electrode active material and a positive electrode active material. The electrode active materials may be used alone or two or more thereof may be used in combination.

<Negative Electrode Active Material>

The negative electrode active material is not particularly limited as long as it can reversibly occlude and release lithium, and materials may be used alone or two or more thereof may be used in combination. Regarding the negative electrode active material, a suitable material can be appropriately selected depending on the type of a desired power storage device. Examples of negative electrode active materials include carbon materials and materials that alloy with lithium such as silicon materials, oxides containing lithium atoms, lead compounds, tin compounds, arsenic compounds, antimony compounds, and aluminum compounds. Since carbon materials and materials that alloy with lithium have a high volume expansion rate during charging of the battery, the effects of the disclosure can be significantly exhibited.

Examples of carbon materials include graphite which is highly crystalline carbon (also those called graphite, natural graphite, artificial graphite, and the like may be exemplified), low crystalline carbon (soft carbon and hard carbon), carbon black (ketjen black, acetylene black, channel black, lamp black, oil furnace black, thermal black, etc.), fullerenes, carbon nanotubes, carbon nanofibers, carbon nanohorns, carbon fibrils, mesocarbon microbeads (MCMB), and pitch-based carbon fibers.

Examples of silicon materials include, in addition to silicon, silicon oxide, silicon alloys, silicon oxide composites represented by SiC, $SiO_xC_y$ ($0<x\leq3$, $0<y\leq5$), $Si_3N_4$, $Si_2N_2O$, or $SiO_x$ ($0<x\leq2$) (for example, materials described in Japanese Patent Laid-Open No. 2004-185810 and Japanese Patent Laid-Open No. 2005-259697), and silicon materials described in Japanese Patent Laid-Open No. 2004-185810. In addition, silicon materials described in Japanese Patent No. 5390336 and Japanese Patent No. 5903761 may be used.

The silicon oxide is preferably a silicon oxide represented by the composition formula $SiO_x$ ($0<x<2$, preferably $0.1\leq x\leq1$).

The silicon alloy is preferably an alloy of silicon and at least one transition metal selected from the group consisting of titanium, zirconium, nickel, copper, iron and molybdenum. Such a transition metal silicon alloy is preferable because it has high electron conductivity and high strength. Regarding the silicon alloy, a silicon-nickel alloy or a silicon-titanium alloy is more preferable, and a silicon-titanium alloy is particularly preferable. A content of silicon in the silicon alloy is preferably 10 mol % or more and more preferably 20 to 70 mol % with respect to 100 mol % of metal elements in the silicon alloy. Here, the silicon material may be any of a single crystal, polycrystal or amorphous material.

In addition, when a silicon material is used as the negative electrode active material, a negative electrode active material other than the silicon material may be used in combination therewith. Examples of such negative electrode active materials include the above carbon materials; conductive polymers such as polyacene; composite metal oxides represented by $A_xB_yO_z$ (A represents an alkali metal or a transition metal, B represents at least one selected from among transition metals such as cobalt, nickel, aluminum, tin, and manganese, 0 represents an oxygen atom, and X, Y and Z are numbers in ranges of $0.05<X<1.10$, $0.85<Y<4.00$, and $1.5<Z<5.00$) and other metal oxides. When a silicon material is used as the negative electrode active material, it is preferable to use a carbon material in combination therewith because the change in volume due to occlusion and release of lithium is made small.

Examples of oxides containing lithium atoms include lithium-transition metal composite oxides such as ternary nickel cobalt lithium manganate, lithium-manganese composite oxides ($LiMn_2O_4$, etc.), lithium-nickel composite oxides ($LiNiO_2$, etc.), lithium-cobalt composite oxides ($LiCoO_2$, etc.), lithium-iron composite oxides ($LiFeO_2$, etc.), lithium-nickel-manganese composite oxides ($LiNi_{0.5}Mn_{0.5}O_2$, etc.), lithium-nickel-cobalt composite oxides ($LiNi_{0.8}Co_{0.2}O_2$, etc.), lithium-transition metal phosphate compounds ($LiFePO_4$, etc.), and lithium-transition metal sulfate compounds ($Li_xFe_2(SO_4)_3$), and lithium-titanium composite oxides (lithium titanate: $Li_4Ti_5O_{12}$) and other conventionally known negative electrode active materials.

The shape of the negative electrode active material is not particularly limited, and may be any shape such as a fine particle shape and a thin film shape, but a fine particle shape is preferable. The average particle size of the negative electrode active material is not particularly limited, and examples of its upper limit and lower limit include 50, 45, 40, 35, 30, 25, 20, 15, 10, 5, 4, 3, 2.9, 2, 1, 0.5, and 0.1 μm. In one embodiment, in order to form a uniform and thin coating, more specifically, if the average particle size is 0.1 μm or more, handling properties are favorable, and if the average particle size is 50 μm or less, it is easy to coat the electrode. Therefore, the average particle size of the negative electrode active material is preferably 0.1 to 50 μm, more preferably 0.1 to 45 μm, still more preferably 1 to 10 μm, and particularly preferably 5 μm.

"Particle size" in the disclosure means the maximum distance among distances between two arbitrary points on the contour line of particles (the same applies hereinafter). In addition, unless otherwise specified, "average particle size" in the disclosure is a value calculated as the average value of particle sizes of particles observed in several to several tens of fields of view using an observation device such as a scanning electron microscope (SEM) and a transmission electron microscope (TEM) (the same applies hereinafter).

In order to significantly exhibit the effects of the disclosure, the negative electrode active material includes preferably 50 mass % or more, more preferably 80 mass % or more, still more preferably 90 mass % or more, and particularly preferably 100 mass % of the carbon material and/or the material alloying with lithium.

In one embodiment, in order to increase the battery capacity of the lithium ion battery, the content of silicon or silicon oxide covered with a carbon layer in the negative electrode active material is preferably 5 mass % or more (for example, 10 mass % or more, 20 mass % or more, 30 mass % or more, 40 mass % or more, 50 mass % or more, 60 mass % or more, 70 mass % or more, 80 mass % or more, 90 mass % or more, or 100 mass %) with respect to 100 mass % of the negative electrode active material.

<Positive Electrode Active Material>

Examples of positive electrode active materials include an inorganic positive electrode active material and an organic positive electrode active material. Examples of inorganic positive electrode active materials include transition metal oxides, composite oxides of lithium and transition metals, and transition metal sulfides. Examples of such transition metals include Fe, Co, Ni, Mn, and Al. Examples of inorganic compounds used for the positive electrode active material include lithium-containing composite metal oxides such as $LiCoO_2$, $LiNiO_2$, $LiMnO_2$, $LiMn_2O_4$, $LiFePO_4$, $LiNi_{1/2}Mn_{3/2}O_4$, $LiCo_{1/3}Ni_{1/3}Mn_{1/3}O_2$, $Li[Li_{0.1}Al_{0.1}Mn_{1.8}]O_4$, and $LiFeVO_4$; transition metal sulfides such as $TiS_2$, $TiS_3$, and amorphous $MoS_2$; and transition metal oxides such as $Cu_2V_2O_3$, amorphous $V_2O-P_2O_5$, $MoO_3$, $V_2O_5$, and $V_6O_{13}$. These compounds may be partially elementally substituted. Examples of organic positive electrode active materials include conductive polymers such as polyacetylene and poly-p-phenylene. An iron oxide having poor electrical conductivity may be used as an electrode active material covered with a carbon material by allowing a carbon source material to be present during reduction firing. In addition, these compounds may be partially elementally substituted.

Among these, in consideration of practicality, electrical characteristics, and long lifespan, $LiCoO_2$, $LiNiO_2$, $LiMnO_2$, $LiMn_2O_4$, $LiFePO_4$, $LiNi_{1/2}Mn_{3/2}O_4$, $LiCo_{1/3}Ni_{1/3}Mn_{1/3}O_2$, and $Li[Li_{0.1}Al_{0.1}Mn_{1.8}]O_4$ are preferable.

Examples of the upper limit and the lower limit of the content of the electrode active material (B-1) with respect to 100 mass % of the slurry include 65, 60, 55, 50, 45, 40, 35, 30, 25, and 20 mass %. In one embodiment, the content is preferably 20 to 65 mass %.

<Conductive Carbon Material (B-2): Also Called Component (B-2)>

Examples of conductive carbon materials include fibrous carbon and carbon black. Conductive carbon materials may be used alone or two or more thereof may be used in combination. The conductive carbon material may be used as a conductive auxiliary carbon material.

Examples of fibrous carbon include vapor-grown carbon fibers (VGCF), carbon nanotubes (CNT), and carbon nanofibers (CNF).

Examples of carbon black include graphite particles, acetylene black, ketjen black, and furnace black.

Examples of the upper limit and the lower limit of the content of the conductive carbon material (B-2) with respect to 100 mass % of the slurry include 5, 4, 3, 2, 1, 0.9, 0.7, 0.5, 0.3, 0.1, 0.09, 0.07, 0.05, 0.03, and 0.01 mass %. In one embodiment, the content is preferably 0.01 to 5 mass %.

Examples of the upper limit and the lower limit of the content of water with respect to 100 mass % of the slurry include 79, 75, 70, 65, 60, 55, 50, 45, 40, 35, 30, 25, and 20 mass %. In one embodiment, the content is preferably 20 to 79 mass %.

<Slurry Viscosity Adjusting Solvent>

In one embodiment, the slurry may contain a slurry viscosity adjusting solvent. Regarding the slurry viscosity adjusting solvent, various known solvents can be used without particular limitation, and they may be used alone or two or more thereof may be used in combination. Examples of solvents include ether solvents, ketone solvents, alcohol solvents, amide solvents, and water.

Examples of the upper limit and the lower limit of the content of the slurry viscosity adjusting solvent with respect to 100 mass % of the slurry include 10, 9, 7, 5, 3, 2, 1, and 0 mass %. In one embodiment, the content is preferably 0 to 10 mass %.

<Hydroxysilyl Compound>

In one embodiment, the slurry may contain a hydroxysilyl compound. In the disclosure, the hydroxysilyl compound means a compound having a structure in which a hydroxy group (—OH) is directly bonded to a silicon atom, the trihydroxysilyl compound means a compound having a trihydroxysilyl group (—Si(OH)$_3$), and the tetrahydroxysilyl compound means a compound represented by Si(OH)$_4$.

In one embodiment, the trihydroxysilyl compound is a compound represented by the following general formula

(in the formula, R represents a substituted or unsubstituted alkyl group, vinyl group, or (meth)acryloxy group, and examples of substituents include an amino group, a mercapto group, a glycidoxy group, a (meth)acryloxy group, and an epoxy group).

The hydroxysilyl compound is preferably prepared by hydrolyzing a silane coupling agent or tetraalkoxysilane. The hydroxysilyl compound may be partially polycondensed as long as water solubility is not impaired. Regarding the silane coupling agent, a silane coupling agent that is generally used in the technical field of the disclosure can be used.

The silane coupling agent is not particularly limited. Hydroxysilyl compounds produced from the silane coupling agent may be used alone or two or more thereof may be used in combination. In one embodiment, the hydroxysilyl compound includes trihydroxysilylpropylamine.

Examples of trialkoxysilanes include 3-aminopropyltrimethoxysilane, 3-aminopropyltriethoxysilane, N-2(aminoethyl)3-aminopropyltrimethoxysilane, N-2(aminoethyl)3-aminopropyltriethoxysilane, 3-triethoxysilyl-N-(1,3-dimethyl-butylidene)propylamine, N-phenyl-3-aminopropyltrimethoxysilane, 3-mercaptopropyltrimethoxysilane, 3-isocyanatepropyltriethoxysilane, vinyltrimethoxysilane, vinyltriethoxysilane, 3-methacryloxypropyltrimethoxysilane, 3-methacryloxypropyltriethoxysilane, 3-acryloxypropyltrimethoxysilane, and tetrahydroxysilane.

In addition, examples of tetraalkoxysilanes include tetramethoxysilane, tetramethoxysilane oligomers, tetraethoxysilane, and tetraethoxysilane oligomers.

Examples of the upper limit and the lower limit of the content of the hydroxysilyl compound with respect to 100 mass % of the slurry include 15, 13, 10, 9, 7, 5, 3, 2, 1, 0.9, 0.7, 0.5, 0.3, 0.1, 0.09, 0.07, 0.05, 0.04, 0.02, 0.01, and 0 mass %. In one embodiment, the content is preferably 0 to 15 mass %.

<Cross-Linking Agent>

In one embodiment, the slurry may contain a cross-linking agent. Cross-linking agents may be used alone or two or more thereof may be used in combination.

Examples of cross-linking agents include water-soluble polyhydric alcohol, formaldehyde, glyoxal, hexamethylenetetramine, urea formaldehyde resin, methylol melamine resin, carbodiimide, multi-functional epoxide, oxazoline, multi-functional hydrazide, isocyanate, melamine, urea, and mixtures thereof.

The water-soluble polyhydric alcohol is a water-soluble alcohol among alcohols having two or more hydroxy groups.

Examples of water-soluble polyhydric alcohols include methylene glycol, ethylene glycol, propylene glycol, isoprene glycol, 1,3-butylene glycol, 1,4-butylene glycol, diethylene glycol, dipropylene glycol, polyethylene glycol, polypropylene glycol, glycerin, diglycerin, and polyglycerin.

Among these, a water-soluble polyhydric alcohol represented by a general formula (B1):

[Chem. 4]

(B1)

(in the formula, R represents a methylene group, an ethylene group, or a propylene group, and n is an integer of 1 or more), particularly polyethylene glycol (n=1 to 6) is preferable.

Examples of the upper limit and the lower limit of the content of the cross-linking agent with respect to 100 mass % of the slurry include 20, 19, 17, 15, 13, 10, 9, 7, 5, 3, 2, 1, 0.9, 0.7, 0.5, 0.3, 0.1, 0.09, 0.05, 0.03, 0.01, 0.009, 0.005, 0.003, 0.001, and 0 mass %. In one embodiment, the content is preferably 0 to 20 mass %.

<Thickener>

In one embodiment, the slurry may contain a thickener. Thickeners may be used alone or two or more thereof may be used in combination.

Examples of thickeners include cellulose polymers such as carboxymethyl cellulose, methyl cellulose, and hydroxypropyl cellulose, ammonium salts thereof and alkali metal salts; (modified)poly(meth)acrylic acid, ammonium salts thereof and alkali metal salts; polyvinyl alcohols such as (modified) polyvinyl alcohols, copolymers of acrylic acid or acrylate and vinyl alcohols, and copolymers of maleic anhydride or maleic acid or fumaric acid and vinyl alcohols; and polyethylene glycol, polyethylene oxide, polyvinylpyrrolidone, modified polyacrylic acid, oxidized starch, phosphate starch, casein, various modified starches, acrylonitrile-butadiene copolymer hydride, and the like.

Examples of the upper limit and the lower limit of the content of the thickener with respect to 100 mass % of the slurry include 20, 19, 17, 15, 13, 10, 9, 7, 5, 3, 2, 1, 0.9, 0.7, 0.5, 0.3, 0.1, 0.09, 0.05, 0.03, 0.01, 0.009, 0.005, 0.003, 0.001, and 0 mass %. In one embodiment, the content is preferably 0 to 20 mass %.

<Additives>

The slurry may contain an agent that does not correspond to any of the conductive carbon material dispersing agent for a lithium ion battery, the water-soluble poly(meth)acrylamide (A-1), the polymer (A-2), the electrode active material (B-1), the conductive carbon material (B-2), water, the slurry viscosity adjusting solvent, the hydroxysilyl compound, the cross-linking agent, and the thickener as an additive.

Examples of the content of the additive with respect to 100 mass % of the slurry include 0 to 5 mass %, less than 1 mass %, less than 0.1 mass %, less than 0.01 mass %, and 0 mass %.

Examples of additives include dispersing agents other than the conductive carbon material dispersing agent for a lithium ion battery, leveling agents, and antioxidants.

Examples of dispersing agents other than the conductive carbon material dispersing agent for a lithium ion battery include anionic dispersing agents, cationic dispersing agents, nonionic dispersing agents, and polymer dispersing agents.

Examples of leveling agents include surfactants such as alkyl surfactants, silicon surfactants, fluorine surfactants, and metallic surfactants. When a surfactant is used, it is possible to prevent repelling occurring during coating and improve the smoothness of the slurry layer (coating layer).

Examples of antioxidants include phenol compounds, hydroquinone compounds, organic phosphorus compounds, sulfur compounds, phenylenediamine compounds and polymer type phenol compounds. The polymer type phenol compound is a polymer having a phenol structure in its molecule. The weight average molecular weight of the polymer type phenol compound is preferably 200 to 1,000 and more preferably 600 to 700.

Examples of additives other than the above examples include at least one compound selected from the group consisting of unsaturated carboxylic acids, unsaturated amides, and salts thereof.

Examples of a method of producing the slurry include a method of mixing the conductive carbon material dispersing agent for a lithium ion battery, the polymer (A-2), the electrode active material (B-1), the conductive carbon material (B-2), and water and a method of mixing the water-soluble poly(meth)acrylamide (A-1), the polymer (A-2), the electrode active material (B-1), the conductive carbon material (B-2), and water. Here, the order of mixing in the above method is not particularly limited.

Examples of a slurry mixing device include a ball mill, a sand mill, a pigment dispersing machine, a grinder, an ultrasonic dispersing machine, a homogenizer, a planetary mixer, and a Hobart mixer.

The slurry for a lithium ion battery electrode can be used as a slurry for a lithium ion battery negative electrode and a slurry for a lithium ion battery positive electrode.

[Electrode for Lithium Ion Battery]

The disclosure provides an electrode for a lithium ion battery obtained by applying the slurry for a lithium ion battery electrode to a current collector and performing drying and curing. The electrode has a cured product of the slurry for a lithium ion battery electrode on the current collector.

A coating device is not particularly limited, and examples thereof include conventionally known coating devices such as a comma coater, a gravure coater, a micro gravure coater, a die coater, and a bar coater.

A drying method is not particularly limited, the temperature is preferably about 80 to 200° C., and more preferably about 90 to 180° C., and the atmosphere may be dry air or an inactive atmosphere. In addition, in order to improve electrode adhesion, a drying method using far infrared rays can be used.

The thickness of the electrode (cured coating) is not particularly limited, and is preferably about 5 to 300 µm and more preferably about 10 to 250 µm. Within the above range, it is easy to obtain a sufficient Li occlusion and release function for a high-density current value.

Regarding the current collector, various known collectors can be used without particular limitation. The material of the current collector is not particularly limited, and examples thereof include metal materials such as copper, iron, aluminum, nickel, stainless steel, and nickel plated steel and carbon materials such as carbon cloth and carbon paper. The form of the current collector is not particularly limited, and in the case of metal materials, a metal foil, a metal cylinder, a metal coil, a metal plate and the like may be exemplified, and in the case of carbon materials, a carbon plate, a carbon thin film, a carbon cylinder and the like may be exemplified. Among these, when the electrode active material is used for the negative electrode, a copper foil is preferable as a current collector because it is currently used in industrialized products.

The electrode for lithium ion battery can be used as a negative electrode for lithium ion battery or a positive electrode for lithium ion battery.

[Lithium Ion Battery]

The disclosure provides a lithium ion battery including the electrode for a lithium ion battery. In one embodiment, the battery includes an electrolytic solution, a separator, a positive electrode and the like. These are not particularly limited.

Examples of electrolytic solutions include a non-aqueous electrolytic solution in which a supporting electrolyte is dissolved in a non-aqueous solvent. In addition, the non-aqueous electrolytic solution may contain a film forming agent.

Regarding the non-aqueous solvent, various known solvents can be used without particular limitation, and they may be used alone or two or more thereof may be used in combination. Examples of non-aqueous solvents include chain carbonate solvents such as diethyl carbonate, dimethyl carbonate, and ethyl methyl carbonate; cyclic carbonate solvents such as ethylene carbonate, propylene carbonate, and butylene carbonate; chain ether solvents such as 1,2-dimethoxyethane; cyclic ether solvents such as tetrahydrofuran, 2-methyltetrahydrofuran, sulfolane, and 1,3-dioxolane; chain ester solvents such as methyl formate, methyl acetate and methyl propionate; cyclic ester solvents such as γ-butyrolactone and γ-valerolactone; and acetonitrile. Among these, a combination of mixed solvents containing cyclic carbonate and chain carbonate is preferable.

A lithium salt is used as the supporting electrolyte. Regarding the lithium salt, various known salts can be used without particular limitation, and they may be used alone or two or more thereof may be used in combination. Examples of supporting electrolytes include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among these, $LiPF_6$, $LiClO_4$, and $CF_3SO_3Li$, which are easily soluble in a solvent and exhibit a high degree of dissociation, are preferable. Since lithium ion conductivity becomes higher when a supporting electrolyte having a higher degree of dissociation is used, it is possible to adjust lithium ion conductivity depending on the type of the supporting electrolyte.

Regarding the film forming agent, various known agents can be used without particular limitation, and they may be used alone or two or more thereof may be used in combination. Examples of film forming agents include carbonate compounds such as vinylene carbonate, vinyl ethylene carbonate, vinyl ethyl carbonate, methyl phenyl carbonate, fluoroethylene carbonate, and difluoroethylene carbonate; alkene sulfides such as ethylene sulfide and propylene sulfide; sultone compounds such as 1,3-propane sultone and 1,4-butane sultone; and acid anhydrides such as maleic anhydride and succinic anhydride. The content of the film forming agent in the electrolytic solution is not particularly limited, but is preferably 10 mass % or less, 8 mass % or less, 5 mass % or less, and 2 mass % or less in this order. When the content is 10 mass % or less, it is easy to obtain advantages of the film forming agent such as reducing an initial irreversible capacity and improving a low temperature characteristic and a rate characteristic.

The separator is an article interposed between the positive electrode and the negative electrode and is used to prevent short circuiting between the electrodes. Specifically, porous separators such as a porous film and a non-woven fabric can be preferably used, and used by impregnating them with the non-aqueous electrolytic solution. Regarding the material of the separator, polyolefins such as polyethylene and polypropylene, polyether sulfone, and the like are used, and polyolefins are preferably used.

Here, when a lithium ion battery is produced using a negative electrode produced using the slurry for a lithium ion battery electrode as the negative electrode and a positive electrode produced without using the slurry for a lithium ion battery electrode as the positive electrode, various known positive electrodes can be used without particular limitation.

Regarding the positive electrode, various known electrodes can be used without particular limitation. Regarding the positive electrode, a positive electrode obtained by preparing a slurry obtained by mixing a positive electrode active material, a conductive aid, a binder for a positive electrode and an organic solvent, applying the prepared slurry to a positive electrode current collector, and performing drying and pressing may be exemplified.

Regarding the binder for a positive electrode, various known binders can be used without particular limitation, and they may be used alone or two or more thereof may be used in combination. Examples of binders for a positive electrode include fluorine resins (polyvinylidene fluoride, polytetrafluoroethylene, etc.), polyolefins (polyethylene, polypropylene, etc.), polymers having an unsaturated bond (styrene butadiene rubber, isoprene rubber, butadiene rubber, etc.), and acrylic acid polymers (acrylic acid copolymers, methacrylic acid copolymers, etc.).

Examples of positive electrode current collectors include an aluminum foil and a stainless steel foil.

The form of the lithium ion battery is not particularly limited. Examples of forms of the lithium ion battery include a cylinder type in which sheet electrodes and separators are spirally formed, a cylinder type having an inside-out structure in which pellet electrodes and separators are combined, and a coin type in which pellet electrodes and separators are laminated. In addition, when batteries with these forms are stored in any exterior case, they can be used in any shape such as a coin type, a cylindrical type, and a rectangular type.

A method of producing the lithium ion battery is not particularly limited, and the lithium ion battery may be assembled in appropriate procedures according to the structure of the battery. Examples of a method of producing a lithium ion battery include the method described in Japanese Patent Laid-Open No. 2013-089437. A battery can be produced by disposing a negative electrode on an exterior case, providing an electrolytic solution and a separator thereon, additionally disposing a positive electrode such that it faces the negative electrode, and performing fixing with a gasket and a sealing plate.

EXAMPLES

Hereinafter, the disclosure will be described in detail with reference to examples and comparative examples. However, the description in the above preferable embodiments and the following examples are provided only for the purpose of exemplification and are not provided for the purpose of limiting the disclosure. Therefore, the scope of the disclosure is not limited to embodiments or examples that are specifically described in this specification, but is limited only by the scope of claims. In addition, unless otherwise noted, in examples and comparative examples, numerical values such as parts and % are based on mass.

Production of Water-Soluble poly(meth)acrylamide (A-1)

Example 1-1

387 g of deionized water was put into a reaction device including a stirrer, a thermometer, a reflux cooling tube, and a nitrogen gas inlet tube, oxygen in the reaction system was removed using nitrogen gas, and the temperature was then raised to 80° C.

300 g of a 50% acrylamide aqueous solution (2.11 mol), 581 g of a 50% acrylamide t-sodium butyl sulfonate aqueous solution (1.27 mol), 0.55 g of sodium methallyl sulfonate (0.0035 mol), 12.7 g of 80% acrylic acid (0.14 mol), 8 g of deionized water, and 21 g of isopropyl alcohol were put into a 2 L beaker, and stirred for 30 minutes to obtain a uniform solution A.

4.1 g of 2,2'-azobis-2-amidinopropane dihydrochloride (product name "NC-32" commercially available from Nippoh Chemicals Co., Ltd.) and 199 g of deionized water were put into a 300 mL beaker and stirred for 30 minutes to obtain a uniform solution B.

The solution A and the solution B were added dropwise at the same time to a reaction device over 3 hours to cause a polymerization reaction. Then, 5.8 g of a 48% sodium hydroxide aqueous solution (0.07 mol) was added as a neutralizing agent and stirred to obtain a conductive carbon material dispersing agent for a lithium ion battery containing the water-soluble poly(meth)acrylamide (A-1) having a solid content concentration of 30 mass %. The type B viscosity of the dispersing agent at 25° C. was 350 mPa·s, and the pH was 5.2.

Examples 1 other than Example 1-1 were performed in the same manner as in Example 1-1 except that the composition in Example 1-1 was changed to that shown in the following table.

Comparative Example 1-1

1,310 g of deionized water, 80.0 g of a 50% acrylamide aqueous solution (0.56 mol), 5.8 g of 80% acrylic acid (0.06 mol), 266.0 g of a 50% acrylamide t-sodium butyl sulfonate aqueous solution (0.58 mol), 46.8 g of 2-hydroxyethyl acrylate (0.40 mol), and 0.25 g of sodium methallyl sulfonate (0.0016 mol) were put into a reaction device including a stirrer, a thermometer, a reflux cooling tube, and a nitrogen gas inlet tube, oxygen in the reaction system was removed using nitrogen gas, and the temperature was then raised to 50° C. 2.0 g of 2,2'-azobis-2-amidinopropane dihydrochloride (product name "NC-32" commercially available from Nippoh Chemicals Co., Ltd.), and 20 g of deionized water were put thereinto, the temperature was raised to 80° C., and the reaction was performed for 3 hours. A dispersing agent containing water-soluble poly(meth)acrylamide having a solid content concentration of 13 mass % was obtained. The type B viscosity of the dispersant at 25° C. was 730 mPa·s, and the pH was 5.1.

Comparative Examples 1 other than Comparative Example 1-1 were performed in the same manner as in Example 1-1 except that the composition was changed to that shown in the following table.

TABLE 1

| | (meth)acrylamide group-containing compound (a) | | Unsaturated sulfonic acid or salts thereof (b) | | (meth)acrylic acid ester (c) | | Other monomers (d) | | Type B viscosity (mPa·s) | Molecular weight (Mw) | pH |
|---|---|---|---|---|---|---|---|---|---|---|---|
| | AM (mol %) | DMAA (mol %) | ATBSNa (mol %) | SMAS (mol %) | HEA (mol %) | HEMA (mol %) | AN (mol %) | AA (mol %) | | | |
| Example 1-1 | 59.9 | | 36.0 | 0.1 | | | | 4.0 | 350 | 130,000 | 5.2 |
| Example 1-2 | 35.0 | | 60.9 | 0.1 | | | | 4.0 | 160 | 20,000 | 6.0 |
| Example 1-3 | 34.7 | | 60.9 | 0.4 | | | | 4.0 | 70 | 240,000 | 5.3 |
| Example 1-4 | 34.9 | | 36.0 | 0.1 | 25.0 | | | 4.0 | 190 | 130,000 | 5.0 |
| Example 1-5 | 3.9 | | 36.0 | 0.1 | 56.0 | | | 4.0 | 110 | 100,000 | 4.8 |
| Example 1-6 | 46.5 | | 11.0 | 0.1 | 33.4 | 5.0 | | 4.0 | 320 | 100,000 | 4.8 |
| Example 1-7 | 39.9 | | 36.0 | 0.1 | | | 20.0 | 4.0 | 320 | 120,000 | 5.2 |
| Comparative Example 1-1 | 34.9 | | 36 | 0.1 | 25 | | | 4.0 | 730 | 620,000 | 5.1 |
| Comparative Example 1-2 | 32.8 | 67.0 | | 0.1 | | | | 0.1 | 1.500 | 100,000 | 8.7 |
| Comparative Example 1-3 | | | 94.9 | 0.1 | | | | 5.0 | 110 | 70,000 | 5.8 |

AM: acrylamide ("50% acrylamide" commercially available from Mitsubishi Chemical Corporation)

DMAA: N,N-dimethylacrylamide ("DMAA" commercially available from KJ Chemicals Corporation)

ATBSNa: acrylamide t-sodium butyl sulfonate ("ATBS-Na" commercially available from Toagosei Co., Ltd.)

SMAS: sodium methallyl sulfonate

HEA: 2-hydroxyethyl acrylate ("HEA" commercially available from Osaka Organic Chemical Industry Ltd.)

HEMA: 2-hydroxyethyl methacrylate

AN: acrylonitrile ("acrylonitrile" commercially available from Mitsubishi Chemical Corporation)

AA: acrylic acid ("80% acrylic acid" commercially available from Osaka Organic Chemical Industry Ltd.)

NaOH: sodium hydroxide ("48% sodium hydroxide solution" commercially available from Kanto Chemical Co., Inc.)

<Type B Viscosity>

The viscosity of each dispersant was measured using a type B viscometer (product name "type B viscometerTVB-10M" commercially available from Toki Sangyo Co., Ltd.) at 25° C. under the following conditions.

When the viscosity was less than 500 mPa·s: No. 2 rotors were used and the rotational speed was 60 rpm.

When the viscosity was 500 to less than 1,000 mPa·s: No. 3 rotors were used and the rotational speed was 30 rpm.

When the viscosity was 1,000 to less than 10,000 mPa·s: No. 3 rotors were used and the rotational speed was 12 rpm.

When the viscosity was 10,000 mPa·s or more: No. 3 rotors were used and the rotational speed was 6 rpm.

<Weight Average Molecular Weight>

The weight average molecular weight was determined as a polyacrylic acid conversion value measured through gel permeation chromatography (GPC) under a 0.2 M phosphate buffer solution/an acetonitrile solution (90/10, PH 8.0). HLC-8220 (commercially available from Tosoh Corporation) was used as a GPC device, and SB-806M-HQ (commercially available from SHODEX) was used as a column.

<pH>

The pH of each dispersant was measured using a glass electrode pH meter (product name "Handy pH meter D-52" commercially available from Horiba Ltd.) at 25° C.

Production of Component (A-2)

Production Example 1

1,007 g of deionized water, 100 g of a 50% acrylamide aqueous solution (0.70 mol), 63.8 g of 80% acrylic acid (0.70 mol), 69.8 g of 2-hydroxyethyl acrylate (0.60 mol), and 0.32 g of sodium methallyl sulfonate (0.0020 mol) were put into a reaction device including a stirrer, a thermometer, a reflux cooling tube, and a nitrogen gas inlet tube, oxygen in the reaction system was removed using nitrogen gas, and the temperature was then raised to 55° C. 1.6 g of 2,2'-azobis-2-amidinopropane dihydrochloride (product name "NC-32" commercially available from Nippoh Chemicals Co., Ltd.) and 16 g of deionized water were put thereinto, the temperature was raised to 80° C., and the reaction was performed for 3 hours. Then, 52.7 g of a 48% sodium hydroxide aqueous solution (0.63 mol) as a neutralizing agent was put thereinto and stirred, ion-exchanged water was added so that the solid content concentration was 13%, and an aqueous solution containing water-soluble poly (meth)acrylamide was obtained. The type B viscosity of the aqueous solution at 25° C. was 3,000 mPa·s, and the pH was 6.0.

Production examples other than Production Example 1 were performed in the same manner as in Production Example 1 except that the composition in Production Example 1 was changed to that shown in the following table.

TABLE 2

| | (meth)acrylamide group-containing compound (a) | Other monomers | | | | Neutralizing agent | Type B viscosity | Molecular weight | |
|---|---|---|---|---|---|---|---|---|---|
| | AM (mol %) | AA (mol %) | HEA (mol %) | AN (mol %) | SMAS (mol %) | NaOH (mol %) | (mPa · s) | (Mw) | pH |
| Production Example 1 | 35.00 | 35.0 | 29.9 | | 0.1 | 90 | 3,000 | 700,000 | 6.0 |
| Production Example 2 | 60.00 | 20.0 | | 20.0 | | 80 | 8,000 | 600,000 | 5.8 |
| Production Example 3 | 99.95 | | | | 0.05 | | 16,900 | 560,000 | 8.5 |

* The amount of the neutralizing agent is a value with respect to 100 mol % of acid groups (carboxylic groups) contained in the component (A-2)

Evaluation of Conductive Carbon Material Paste, and Evaluation of Resin Swelling Ratio and Electrolytic Solution Resistance Example 2-1

Using a commercially available rotation and revolution mixer (product name "Awatori Rentaro" commercially available from Thinky Corporation), 40 parts by mass of the water-soluble poly(meth)acrylamide (A-1) obtained in Example 1-1 in terms of solid content and 60 parts by mass of a conductive carbon material ("Super C65" commercially available from Imerys GC Japan) were put into a container dedicated for the mixer. Ion-exchanged water was added thereto so that the solid content concentration was 13.5%, and the container was set in the rotation and revolution mixer. Then, kneading was performed at 2,000 rpm for 10 minutes, and a conductive carbon material paste was then obtained.

Examples 2 and comparative examples other than Example 2-1 were performed in the same manner as in Example 2-1 except that the composition in Example 2-1 was changed to that shown in the following table, and conductive carbon material pastes were prepared.

<Initial Dispersion Test for Conductive Carbon Material Paste>

The median diameter (D50) of the conductive carbon material paste obtained in Example 2-1 was measured using a commercially available laser diffraction and scattering type particle size distribution measurement device (product name "LA-960" commercially available from HORIBA). A higher value of the measured median diameter indicated poor initial dispersibility of the conductive aid and more aggregation. A smaller value of the median diameter indicated better initial dispersibility of the conductive aid.

The numerical value of the median diameter (D50) was evaluated based on the following evaluation criteria.

A: less than 3.0 μm
B: 3.0 μm or more

<Dispersion Stability Test for Conductive Carbon Material Paste>

The conductive carbon material paste obtained in Example 2-1 was left at room temperature for 24 hours and the median diameter (D50) was then measured. A larger change in the measured value of the median diameter indicated poor dispersion stability of the conductive aid and more aggregation. A smaller change in the value of the median diameter indicated better dispersion stability of the conductive aid. The rate of change of the median diameter (D50) was calculated by the following formula and evaluated under the following evaluation criteria.

Rate of change (%)=[{(D50 of conductive carbon material paste after 24 hours)−(D50 of conductive carbon material paste after initial dispersion test)}/(D50 of conductive carbon material paste after initial dispersion test)]×100

A: less than ±20%
B: ±20% or more

<Evaluation of Electrolytic Solution Swelling Ratio of Water-Soluble Poly(Meth)Acrylamide (A-1) and Evaluation of Electrolytic Solution Resistance>

The water-soluble poly(meth)acrylamide (A-1) obtained in Example 1-1 was poured into a Petri dish and dried with a circulating air dryer under conditions of 105° C. and for 3 hours to produce a solid resin. Then, the mass α of the obtained solid resin was measured. Next, the obtained solid resin was immersed in 50 mL of a dimethyl carbonate solvent and stored under an environment at 25° C. for 48 hours. Then, the mass β after the immersed and stored solid resin was removed from the dimethyl carbonate solvent, and dimethyl carbonate adhered to the surface of the solid resin was sufficiently wiped off was measured. Then, the mass γ after the solid resin after wiping off was dried with a circulating air dryer under conditions of 105° C. and for 1 hour was measured.

The electrolytic solution swelling ratio=(β/γ)×100(%) of the polymer was calculated using the measured masses α and γ. A lower electrolytic solution swelling ratio (closer to 100%) indicated poor electrolytic solution swelling property of the polymer.

A: When the electrolytic solution swelling ratio was less than 110%
B: When the electrolytic solution swelling ratio was 110% or more and less than 120%
C: When the electrolytic solution swelling ratio was 120% or more Similarly, the electrolytic solution resistance ratio=(γ/α)×100(%) of the polymer was calculated using the measured masses α and γ. A lower electrolytic solution resistance ratio (closer to 100%) indicated a lower dissolution rate with respect to the electrolytic solution of the polymer.

A: When the electrolytic solution resistance ratio was 95% or more
B: When the electrolytic solution resistance ratio was less than 95%

TABLE 3

|  |  | Dispersion evaluation ||||| Resin evaluation ||
|  |  | Initial dispersion || Dispersion stability ||| | |
|  | Dispersing agent | D50 (μm) | Evaluation | D50 (μm) | Rate of change (%) | Evaluation | Swelling ratio | Electrolytic solution resistance |
| --- | --- | --- | --- | --- | --- | --- | --- | --- |
| Example 2-1 | Example 1-1 | 2.6 | A | 2.6 | 0 | A | A | A |
| Example 2-2 | Example 1-2 | 2.9 | A | 2.7 | −7 | A | A | A |
| Example 2-3 | Example 1-3 | 2.4 | A | 2.5 | 6 | A | A | A |
| Example 2-4 | Example 1-4 | 2.8 | A | 2.3 | −17 | A | A | A |
| Example 2-5 | Example 1-5 | 2.7 | A | 2.4 | −9 | A | A | A |
| Example 2-6 | Example 1-6 | 2.5 | A | 2.6 | 4 | A | A | A |
| Example 2-7 | Example 1-7 | 2.4 | A | 2.5 | 4 | A | A | A |
| Comparative Example 2-1 | Comparative Example 1-1 | Occurrence of agglomerates |||||  A | A |
| Comparative Example 2-2 | Comparative Example 1-2 | 2.7 | A | 3.6 | 32 | B | B | B |
| Comparative Example 2-3 | Comparative Example 1-3 | 4.1 | B | 3.9 | −5 | A | A | A |
| Comparative Example 2-4 | CMC | 45.0 | B | 55.4 | 23 | B | A | A |
| Comparative Example 2-5 | PVP | 2.4 | A | 2.6 | 6 | A | C | A |

CMC: carboxymethyl cellulose
PVP: polyvinylpyrrolidone

Production of Slurry for a Lithium Ion Battery Electrode and Production and Evaluation of Cell Production of Slurry for Lithium Ion Battery Electrode Example 3-1

A slurry was prepared using a commercially available Home Disper ("Home Disper 2.5 type" commercially available from PRIMIX Corporation). In a mayonnaise bottle as a container, 0.5 parts by mass of the water-soluble poly(meth)acrylamide (A-1) obtained in Example 1-1 in terms of solid content, 4.5 parts by mass of the binder (A-2) obtained in Production Example 1 in terms of solid content, 80 parts by mass of graphite having a D50 (median diameter) of 20 μm, 20 parts by mass of silicon monoxide particles having a D50 (median diameter) of 5 μm ("CC powder" commercially available from OSAKA Titanium technologies Co., Ltd.), and 1 part by mass of a conductive carbon material ("Super C65" commercially available from Imerys GC Japan) were mixed. Ion-exchanged water was added thereto so that the solid content concentration was 47%, and the container was set in the Home Disper. Then, kneading was performed at 2,000 rpm for 30 minutes. Then, defoaming was performed for 1 minute using a rotation and revolution mixer ("Awatori Rentaro" commercially available from Thinky Corporation), and thereby a slurry for a lithium ion battery electrode was obtained.

Examples 3 and comparative examples other than Example 3-1 were performed in the same manner as in Example 3-1 except that the composition in Example 3-1 was changed to that shown in the following table.

Example 4-1

A slurry was prepared using a commercially available Home Disper ("Home Disper 2.5 type" commercially available from PRIMIX Corporation). In a mayonnaise bottle as a container, 0.5 parts by mass of the water-soluble poly (meth)acrylamide (A-1) obtained in Example 1-2 in terms of solid content, 4.5 parts by mass of the binder (A-2) obtained in Production Example 3 in terms of solid content, 100 parts by mass of lithium nickel manganite ($Li[Ni_{1/2}Mn_{3/2}]O_4$, median diameter D50: 3.7 μm) as the electrode active material (B-1), and 1 part by mass of a conductive carbon material ("Super C65" commercially available from Imerys GC Japan) were mixed. Ion-exchanged water was added thereto so that the solid content concentration was 50%, and the container was set in the Home Disper. Then, kneading was performed at 2,000 rpm for 30 minutes. Then, defoaming was performed for 1 minute using a rotation and revolution mixer ("Awatori Rentaro" commercially available from Thinky Corporation), and thereby a slurry for a lithium ion battery electrode was obtained.

In Comparative Example 4-1, a slurry was prepared in the same manner as in Example 4-1 except that the composition in Example 4-1 was changed to that shown in Table 4.

<Storage Stability Test of Slurry for Lithium Ion Battery Electrode>

The storage stability of the slurry for lithium ion battery electrode was evaluated as follows.

The viscosity (unit: mPa·s) of the slurry for lithium ion battery electrode was measured using the type B viscometer and then stored in an oven heated to 40° C. for 3 days. After storage, the viscosity was measured again using the type B viscometer, the change in viscosity was calculated by the following formula and evaluated based on the following evaluation criteria.

Change in viscosity (%)={(viscosity of electrode slurry after storage)/(viscosity of electrode slurry before storage)}×100

A: less than 110%
B: 110% or more and less than 120%
C: 120% or more

<Production of Negative Electrode>

The slurry was uniformly applied to a surface of a current collector formed of a copper foil according to a doctor blade method so that the film thickness after drying was 170 μm, drying was performed at 150° C. for 30 minutes, and heating was then performed at 150° C./vacuum for 120 minutes. Then, press processing was performed by a roll press machine so that the density of the film (electrode active material layer) was 1.5 g/cm³, and thereby an electrode was obtained.

<Production of Positive Electrode>

The slurry was uniformly applied to a surface of a current collector formed of an aluminum foil according to a doctor blade method so that the film thickness after drying was 110 μm, drying was performed at 150° C. for 30 minutes, and heating was then performed at 150° C./vacuum for 120 minutes. Then, press processing was performed by a roll press machine so that the density of the film (electrode active material layer) was 3.0 g/cm³, and thereby an electrode was obtained.

<Evaluation of Electrode Adhesion>

The electrode adhesion was evaluated as follows.

A test piece with a width 2 cm and a length of 10 cm was cut out from the electrode and fixed to the coated surface facing upward. Then, an adhesive tape with a width of 15 mm ("Scotch tape (registered trademark)" commercially available from Nichiban Co., Ltd.) (defined in JIS 21522) was attached to the surface of the active material layer of the test piece while pressing it, and the stress when the adhesive tape was peeled off from one end of the test piece at a rate of 30 mm/min in the 180° direction was then measured using a tensile testing machine ("Tensilon RTM-100" commercially available from A&D Co., Ltd.) under conditions of 25° C. The measurement was performed twice, and the average value thereof was calculated as the peel strength. A higher peel strength indicated a higher adhesion strength between the current collector and the active material layer or superior property of binding between the active materials, and harder peeling off the active material layer from the current collector or separation between the active materials.

<Assembling of Lithium Half Cell>

In a glove box purged with argon, the electrode was punched to a diameter of 16 mm and molded and provided inside a packing on an Al lower lid made of a test cell (commercially available from Nippon Tomcell). Then, a separator (product name "Selion P2010" commercially available from CS TECH CO., LTD) made of a polypropylene porous film punched to a diameter of 24 mm was provided, 500 μL of an electrolytic solution was additionally injected to prevent air from entering, and a commercially available metallic lithium foil punched to 16 mm and molded was then provided, an exterior body of the test cell was closed and sealed with a screw to assemble a lithium half cell. Here, the electrolytic solution used was a solution in which $LiPF_6$ was dissolved in a concentration of 1 mol/L in a solvent containing ethylene carbonate/ethyl methyl carbonate=1/1 (mass ratio).

<Charging and Discharging Measurement>

The lithium half cell was put into a thermostatic tank at 25° C., charging was started at a constant current (0.1 C), and charging was completed (cut off) when the voltage reached 0.01 V. Then, discharging was started at a constant current (0.1 C), and discharging was completed (cut off) when the voltage reached 1.0 V. This charging and discharging were repeated 30 times.

Here, in the measurement condition, "1 C" indicates a current value at which a cell having a certain capacitance was discharged at a constant current and the discharging was completed in 1 hour. For example, "0.1 C" is a current value at which discharging is completed over 10 hours and "10 C" is a current value at which discharging is completed over 0.1 hours.

<Discharge Capacity Retention Rate>

The discharge capacity retention rate was calculated by the following formula.

Discharge capacity retention rate={(discharge capacity in the 30th cycle)/(discharge capacity in the 1st cycle)}×100(%)

<HAZE>

The aqueous solutions of Examples 3 and 4 and Comparative Examples 3 and 4 were applied onto flat glass plates and films having a thickness of 5 to 30 μm were produced in a circulating air dryer at 80° C. The HAZE of the produced film was measured using a turbidity meter "NDH-2000 (commercially available from Nippon Denshoku Industries Co., Ltd.)."

As a result of measurement, the HAZEs of Examples 3-3, 3-8, and 3-9 were 3, 6, and 26, respectively. On the other hand, the HAZEs of Examples 3 and 4 other than the above examples were 1 or less.

TABLE 4

| | Electrode active material (B-1) | | | Conductive carbon material (B-2) | Dispersing agent | | (A-2) | | Storage stability of electrode slurry | Electrode adhesion (N/m) | Discharge capacity retention rate(%) |
|---|---|---|---|---|---|---|---|---|---|---|---|
| | Silicon monoxide | Graphite | Lithium nickel manganite | | | | | | | | |
| | Parts by mass | Parts by mass | Parts by mass | Parts by mass | Name | Parts by mass | Name | Parts by mass | | | |
| Example 3-1 | 20 | 80 | 0 | 1 | Example 1-1 | 0.5 | Production Example 1 | 4.5 | A | 7.3 | 80 |
| Example 3-2 | 20 | 80 | 0 | 1 | Example 1-2 | 0.5 | Production Example 1 | 4.5 | A | 6.9 | 85 |
| Example 3-3 | 50 | 50 | 0 | 1 | Example 1-3 | 0.5 | Production Example 1 | 4.5 | A | 6.3 | 70 |
| Example 3-4 | 30 | 70 | 0 | 1 | Example 1-4 | 0.5 | Production Example 1 | 4.5 | A | 6.3 | 80 |
| Example 3-5 | 20 | 80 | 0 | 1 | Example 1-4 | 1.0 | Production Example 1 | 4.0 | A | 7.6 | 86 |
| Example 3-6 | 0 | 100 | 0 | 1 | Example 1-5 | 0.5 | Production Example 1 | 4.5 | A | 6.1 | 91 |
| Example 3-7 | 20 | 80 | 0 | 1 | Example 1-4 | 0.5 | Production Example 2 | 4.5 | A | 6.7 | 85 |
| Example 3-8 | 20 | 80 | 0 | 1 | Example 1-7 | 0.5 | Production Example 2 | 4.5 | A | 5.5 | 79 |
| Example 3-9 | 20 | 80 | 0 | 1 | Example 1-6 | 0.5 | SBR + CMC(50 + 50) | 4.5 | A | 6.0 | 75 |
| Example 4-1 | 0 | 0 | 100 | 1 | Example 1-2 | 0.5 | Production Example 3 | 4.5 | A | 38.9 | 85 |
| Comparative Example 3-1 | 20 | 80 | 0 | 1 | None | 0.0 | Production Example 1 | 5.0 | B | 2.4 | 70 |
| Comparative Example 3-2 | 20 | 80 | 0 | 1 | None | 0.0 | Production Example 2 | 5.0 | B | 4.0 | 73 |
| Comparative Example 4-1 | 0 | 0 | 100 | 1 | None | 0.0 | Production Example 3 | 5.0 | C | 7.9 | 76 |

SBR: styrene-butadiene copolymer latex
CMC: carboxymethyl cellulose

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A conductive carbon material dispersing agent for a lithium ion battery, comprising
   a water-soluble poly(meth)acrylamide (A-1) which contains 2 to 60 mol % of structural units derived from a (meth)acrylamide group-containing compound (a) and 10 to 70 mol % of structural units derived from an unsaturated sulfonic acid or salts thereof (b), and which has a weight average molecular weight of 10,000 to 250,000.

2. The conductive carbon material dispersing agent for a lithium ion battery according to claim 1,
   wherein the water-soluble poly(meth)acrylamide (A-1) contains 20 to 70 mol % of a structural unit derived from a (meth)acrylic acid ester (c).

3. A slurry for a lithium ion battery electrode, comprising:
   the conductive carbon material dispersing agent for a lithium ion battery according to claim 1;
   a polymer (A-2);
   an electrode active material (B-1);
   a conductive carbon material (B-2); and
   water.

4. The slurry for a lithium ion battery electrode according to claim 3,
   wherein the polymer (A-2) is a water-soluble poly(meth)acrylamide (A-2A) containing a structural unit derived from a (meth)acrylamide group-containing compound (a).

5. An electrode for a lithium ion battery obtained by applying the slurry for a lithium ion battery electrode according to claim 3 to a current collector and performing drying.

6. A lithium ion battery comprising the electrode for a lithium ion battery according to claim 5.

* * * * *